US012417739B2

(12) United States Patent
Kim

(10) Patent No.: US 12,417,739 B2
(45) Date of Patent: Sep. 16, 2025

(54) DISPLAY DEVICE AND METHOD OF DRIVING THE SAME

(71) Applicant: SAMSUNG DISPLAY CO., LTD., Yongin-si (KR)

(72) Inventor: Hong Kyu Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/646,013

(22) Filed: Apr. 25, 2024

(65) Prior Publication Data

US 2025/0124864 A1 Apr. 17, 2025

(30) Foreign Application Priority Data

Oct. 13, 2023 (KR) ........................ 10-2023-0136665

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2300/0819* (2013.01); *G09G 2300/0842* (2013.01); *G09G 2310/0243* (2013.01); *G09G 2310/08* (2013.01); *G09G 2320/0233* (2013.01); *G09G 2330/021* (2013.01); *G09G 2340/0435* (2013.01)

(58) Field of Classification Search
CPC ......... G09G 3/30–3291; G09G 3/2096; G09G 2300/0819; G09G 2300/0842; G09G 2310/0243; G09G 2310/08; G09G 2320/0233; G09G 2320/021; G09G 2320/0435
See application file for complete search history.

(56) References Cited

U.S. PATENT DOCUMENTS

| | | | | |
|---|---|---|---|---|
| 2020/0302875 | A1 | 9/2020 | Park et al. | |
| 2020/0394961 | A1 | 12/2020 | Kim et al. | |
| 2021/0035504 | A1 | 2/2021 | Lee et al. | |
| 2022/0262295 | A1 * | 8/2022 | Kim | G09G 3/2007 |
| 2024/0371315 | A1 * | 11/2024 | Liu | G09G 3/3233 |

OTHER PUBLICATIONS

European Search Report issued in European Patent Application No. 24193539.4 on Dec. 16, 2024.

* cited by examiner

*Primary Examiner* — Hang Lin
(74) *Attorney, Agent, or Firm* — F. CHAU & ASSOCIATES, LLC

(57) ABSTRACT

A display device includes a display panel, a scan driver, and a timing controller. The display panel includes pixels connected to scan lines and initialization lines. The scan driver includes first stages configured to supply enable scan signals to the scan lines during an active period of one frame, and second stages configured to supply enable initialization signals to the initialization lines during the active period and a blank period of the one frame. The timing controller is configured to supply scan clock signals and initialization clock signals to the scan driver. When the enable initialization signals are supplied in an overlapping manner to two of the initialization lines during the active period of a current frame, the enable scan signals having different widths are supplied to respective areas of the display panel.

32 Claims, 21 Drawing Sheets

DISPLAY DEVICE AND METHOD OF DRIVING THE SAME

CROSS-REFERENCE TO RELATED APPLICATION

This patent application claims priority under 35 U.S.C. § 119 to Korean patent application number 10-2023-0136665 filed on Oct. 13, 2023 the disclosure of which is incorporated by reference in its entirety herein

1. TECHNICAL FIELD

Embodiments of the present disclosure are directed to a display device and a method of driving the same.

2. DISCUSSION OF RELATED ART

A display device is used as a connection medium between a user and information. Examples of the display device includes a liquid crystal display device and an organic light-emitting display device.

Such display devices may display images with various content. For example, the display devices may display various types of images such as still images, web pages, and images for movies or electronic games. In the case where a still image is displayed on a display device, frequent frame conversion is not required. On the other hand, in the case where images for movies or electronic games are displayed on a display device, frequent frame conversion is needed.

However, when frequent frame conversion is needed, a large amount of power may be consumed. Further, the display device may need to be refreshed using various refresh rates. However, due to the use of these various refresh rates, visibility may decrease.

SUMMARY

At least one embodiment of the present disclosure is directed to a display device and a method of driving the display device to display images at various refresh rates to enable visibility to be increased.

An embodiment of the present disclosure provides a display device, including: a display panel; a scan driver; and a timing controller. The display panel includes pixels connected to scan lines and initialization lines. The scan driver includes first stages configured to supply enable scan signals to the scan lines during an active period of one frame, and second stages configured to supply enable initialization signals to the initialization lines during the active period and a blank period of the one frame. The timing controller is configured to supply scan clock signals and initialization clock signals to the scan driver. When the enable initialization signals are supplied in an overlapping manner to two of the initialization lines during the active period of a current frame, the enable scan signals having different widths are supplied to respective areas of the display panel.

In an embodiment, an area of the display panel in the active period of the current frame may include: a first area where pixels supplied with the enable initialization signals during the blank period of a preceding frame are positioned; a second area where pixels supplied with the enable initialization signals corresponding to the blank period of the preceding frame are positioned; and a third area that excludes the first area and the second area.

In an embodiment, during the active period of the current frame, the scan driver may supply enable scan signals with a first width to scan lines positioned in the first area, may supply enable scan signals with a second width different from the first width to scan lines positioned in the second area, and may supply enable scan signals with a third width different from the first width and the second width to scan lines positioned in the third area.

In an embodiment, the first width may greater than the second width, and the second width may be greater than the third width.

In an embodiment, the timing controller may include: a driver configured to receive a first data enable signal and operate in response to the first data enable signal; a first logic circuit configured to determine a length of a blank period using the first data enable signal; a second logic circuit configured to determine the first area and the second area based on the length of the blank period determined by the first logic circuit; a scan clock generator configured to receive a second data enable signal output from the driver and generate the scan clock signals corresponding to the first area, the second area, and the third area; and an output circuit configured to output the scan clock signals.

In an embodiment, the second data enable signal may be the first data enable signal delayed by a preset time.

In an embodiment, the second logic circuit may include: a third logic circuit configured to determine the first area based on the length of the blank period; and a fourth logic circuit configured to determine the second area based on the length of the blank period.

In an embodiment, the scan clock generator may include: a first lookup table configured to store duty cycle information corresponding to a number of scan lines included in the first area; a first scan clock generator connected to the first lookup table, and configured to generate a first clock signal having an on-duty with the first width corresponding to the number of scan lines included in the first area; a second lookup table configured to store duty cycle information corresponding to a number of scan lines included in the second area; a second scan clock generator connected to the second lookup table, and configured to generate a second clock signal having an on-duty with the second width corresponding to the number of scan lines included in the second area; and a third scan clock generator configured to generate a third clock signal having an on-duty with the third width.

In an embodiment, the first lookup table may store duty cycle information with the first width having different lengths corresponding to the number of scan lines included in the first area.

The second lookup table may store duty cycle information with the second width having different lengths corresponding to the number of scan lines included in the second area.

In an embodiment, the output circuit may supply the first clock signal as the scan clock signal to the first stages connected to the scan lines positioned in the first area, may supply the second clock signal as the scan clock signal to the first stages connected to the scan lines positioned in the second area, and may supply the third clock signal as the scan clock signal to the first stages connected to the scan lines positioned in the third area.

In an embodiment, during the active period of the current frame, when the enable initialization signal corresponding to the blank period of the preceding frame is not supplied, the scan driver may supply the enable scan signals having an identical width to the scan lines.

In an embodiment, the scan driver may supply the enable initialization signals having different widths to respective areas of the display panel.

An embodiment of the present disclosure provides a display device, including: a display panel; a scan driver; and a timing controller. The display panel includes pixels connected to scan lines and initialization lines. The scan driver includes first stages configured to supply enable scan signals to the scan lines during an active period of one frame, and second stages configured to supply an enable initialization signal to the initialization lines during the active period and a blank period of the one frame. The timing controller is configured to supply scan clock signals and initialization clock signals to the scan driver. When the enable initialization signals are supplied in an overlapping manner to two of the initialization lines during the active period of a current frame, the enable initialization signals having different widths are supplied to respective areas of the display panel.

In an embodiment, an area of the display panel in the active period of the current frame may include: a first area where pixels supplied with the enable initialization signals during the blank period of a preceding frame are positioned; a second area where pixels supplied with the enable initialization signals corresponding to the blank period of the preceding frame are positioned; and a third area that excludes the first area and the second area.

In an embodiment, during the active period of the current frame, the scan driver may supply enable initialization signals with a first width to initialization lines positioned in the first area, may supply enable initialization signals with a second width different from the first width to initialization lines positioned in the second area, and may supply enable initialization signals with a third width different from the first width and the second width to initialization lines positioned in the third area.

In an embodiment, the first width may be less than the second width, and the second width may be less than the third width.

In an embodiment, the timing controller may include: a driver configured to receive a first data enable signal and operate based on the first data enable signal; a first logic circuit configured to determine a length of a blank period using the first data enable signal; a second logic circuit configured to determine the first area and the second area based on the length of the blank period determined by the first logic circuit; an initialization clock generator configured to receive a second data enable signal outputted from the driver and generate the initialization clock signals corresponding to the first area, the second area, and the third area; and an output circuit configured to output the initialization clock signals.

In an embodiment, the initialization clock generator may include: a first lookup table configured to store duty cycle information corresponding to a number of initialization lines included in the first area; a first initialization clock generator connected to the first lookup table, and configured to generate a first clock signal having an on-duty with the first width corresponding to the number of initialization lines included in the first area; a second lookup table configured to store duty cycle information corresponding to a number of initialization lines included in the second area; a second initialization clock generator connected to the second lookup table, and configured to generate a second clock signal having an on-duty with the second width corresponding to the number of initialization lines included in the second area; and a third initialization clock generator configured to generate a third clock signal having an on-duty with the third width.

In an embodiment, the output circuit may supply the first clock signal as the initialization clock signal to the second stages connected to the initialization lines positioned in the first area, may supply the second clock signal as the initialization clock signal to the second stages connected to the initialization lines positioned in the second area, and may supply the third clock signal as the initialization clock signal to the second stages connected to the initialization lines positioned in the third area.

An embodiment of the present disclosure provides a display device, including: a display panel and a scan driver. The display panel includes pixels connected to first to n-th scan lines (where n is a natural number) and first to n-th initialization lines. The scan driver is configured to supply enable scan signals to scan lines and supply enable initialization signals to initialization lines during a first mode, and supply enable initialization signals to the initialization lines during a second mode. When a period in which an i-th pixel row (where i is a natural number) of the display panel operates in the first mode overlaps a period in which an i+a-th pixel row (where a is a natural number) of the display panel operates in the second mode, a scan signal with a first width may be supplied to an i-th scan line of the scan lines, and a scan signal with a second width different from the first width may be supplied to an i+a-th scan line of the scan lines.

In an embodiment, a scan signal with a third width different from the first width and the second width is supplied to an i+a+b-th scan line (where b is a natural number) of the scan lines positioned on an i+a+b-th pixel row that operates only in the first mode.

In an embodiment, the first width is greater than the second width, and the second width is greater than the third width.

In an embodiment, an initialization signal with a fourth width is supplied to an i-th initialization line of the initialization lines, and an initialization signal with a fifth width different from the fourth width is supplied to an i+a-th initialization line of the initialization lines.

In an embodiment, an initialization signal with a sixth width different from the fourth width and the fifth width may be supplied to an i+a+b-th initialization line (where b is a natural number) of the initialization lines positioned on an i+a+b-th pixel row that operates only in the first mode.

In an embodiment, the fourth width may be less than the fifth width, and the fifth width may be less than the sixth width.

An embodiment of the present disclosure may provide a method of driving a display device including pixels included in a display panel and connected to scan lines and initialization lines. The method may include supplying enable scan signals to the scan lines during an active period of one frame, and supplying enable initialization signals to the initialization lines during the active period and a blank period of the one frame. When, during the active period of a current period, the enable initialization signals corresponding to the blank period of a preceding frame are supplied, the enable scan signals having different widths are supplied to respective areas of the display panel.

In an embodiment, the areas of the pixel component may include: a first area where pixels supplied with the enable initialization signals during the blank period of a preceding frame are positioned; a second area where pixels supplied with the enable initialization signals corresponding to the blank period of the preceding frame are positioned; and a third area that excludes the first area and the second area.

In an embodiment, the method may further include: supplying enable scan signals with a first width to scan lines positioned in the first area; supplying enable scan signals with a second width different from the first width to scan lines positioned in the second area; and supplying enable scan signals with a third width different from the first width and the second width to scan lines positioned in the third area.

In an embodiment, the first width may be greater than the second width, and the second width may be greater than the third width.

In an embodiment, the enable initialization signals may have different widths for the respective areas of the display panel corresponding to the active period of the current frame.

In an embodiment, the method may further include: supplying enable initialization signals with a first width to the initialization lines positioned in the first area; supplying enable initialization signals with a second width different from the first width to the initialization lines positioned in the second area; and supplying enable initialization signals with a third width different from the first width and the second width to the initialization lines positioned in the third area.

In an embodiment, the first width may be less than the second width, and the second width may be less than the third width.

DETAILED DESCRIPTION

Figure 1:
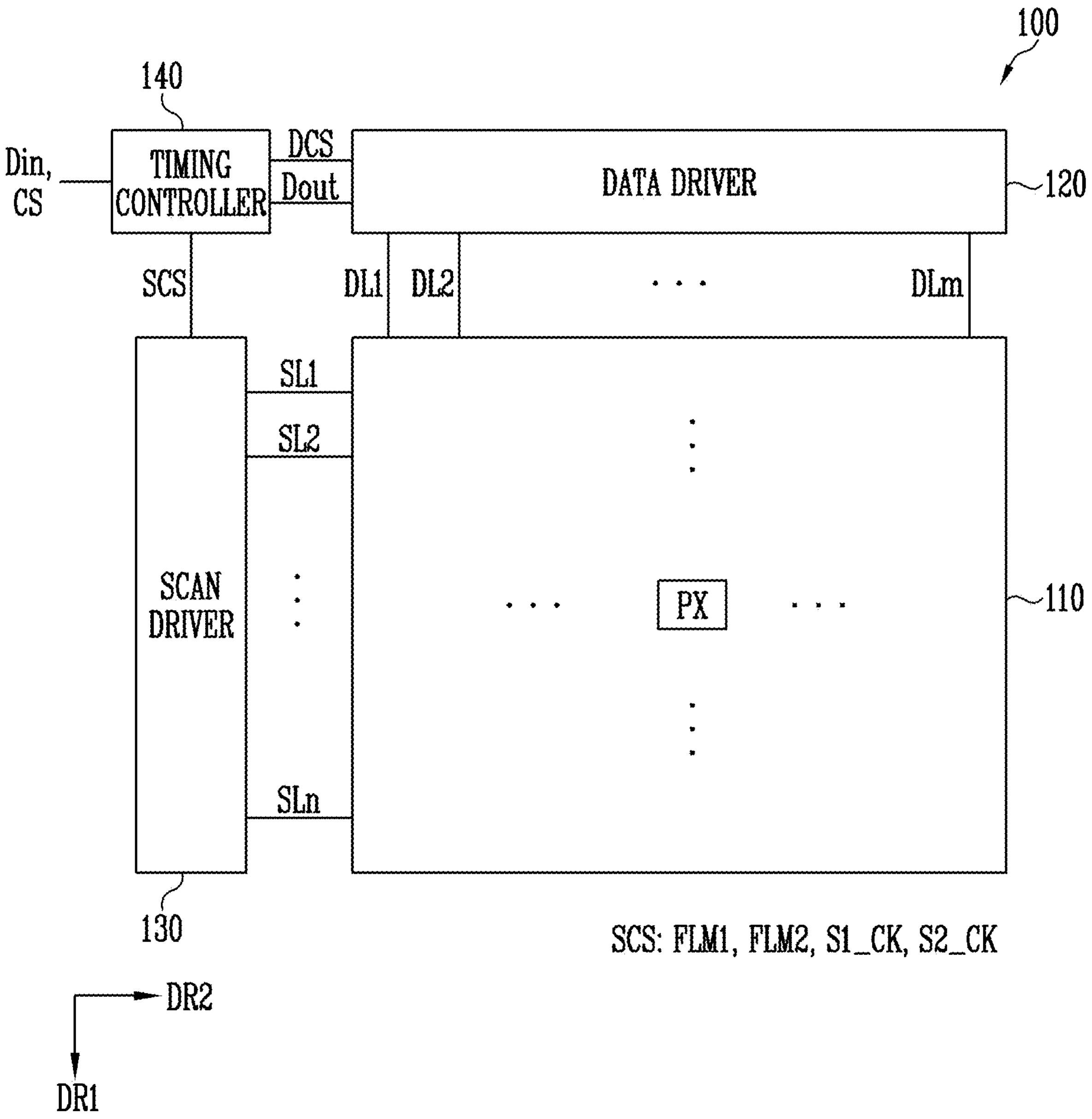
FIG. 1 is a diagram illustrating a display device in accordance with an embodiment of the present disclosure.

Hereinafter, embodiments of the present invention will be described in detail with reference to the attached drawings, such that those skilled in the art can implement the present invention. The present disclosure may be implemented in various forms, and is not limited to the embodiments to be described herein below.

Reference should be made to the drawings, in which similar reference numerals are used throughout the different drawings to designate similar components. Therefore, the aforementioned reference numerals may be used in other drawings.

Furthermore, the expression "being the same" may mean "being substantially the same". In other words, the expression "being the same" may include a range that can be tolerated by those skilled in the art. The other expressions may also be expressions from which the term "substantially" has been omitted.

Some embodiments are described in the accompanying drawings in connection with functional blocks, units and/or modules. Those skilled in the art will understand that such blocks, units, and/or modules may be physically implemented by logic circuits, discrete components, microprocessors, hard-wired circuits, memory elements, line connections, and other electronic circuits. These may be formed using semiconductor-based fabrication techniques or other fabrication techniques. For blocks, units, and/or modules implemented by a microprocessor or other similar hardware, they may be programmed and controlled using software to perform various functions discussed herein, and may be optionally driven by firmware and/or software. In addition, each block, unit, and/or module may be implemented by dedicated hardware, or be implemented by a combination of dedicated hardware which performs some functions and a processor which performs different functions (e.g., one or more programmed microprocessors and related circuits). Furthermore, in some embodiments, blocks, units and/or modules may be physically separated into two or more individual blocks, units and/or modules which interact with each other without departing from the scope of the inventive concept. In some embodiments, blocks, units and/or modules may be physically combined into more complex blocks, units and/or modules without departing from the scope of the inventive concept.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure.

However, the present disclosure is not limited to the following embodiments and may be modified into various forms. Each embodiment to be described below may be implemented alone, or combined with at least another embodiment to make various combinations of embodiments.

FIG. 1 is a diagram illustrating a display device 100 in accordance with an embodiment of the present disclosure.

Referring to FIG. 1, the display device 100 in accordance with an embodiment of the present disclosure may include a pixel component 110 (or a display panel), a data driver 120 (e.g., a driver circuit), a scan driver 130 (e.g., a driver circuit), and a timing controller 140 (e.g., a controller circuit).

The pixel component 110 may include pixels PX positioned to be connected to scan lines SL1, SL2, . . . , SLn (where n is a natural number) and data lines DL1, DL2, . . . , DLm (where m is a natural number).

The data lines DL1 to DLm may be disposed to extend in a first direction DR1. The first direction DR1 may be, for example, a direction in which an upper side and a lower side of the pixel component 110 are connected to each other. Alternatively, the first direction DR1 may be a direction in which a left side and a right side of the pixel component 110 are connected to each other, or may indicate other directions.

The scan lines SL1 to SLm may be disposed to extend in a second direction DR2. The second direction DR2 may be a direction perpendicular to the first direction DR1. The second direction DR2 may be, for example, a direction in which the left side and the right side of the pixel component 110 are connected to each other. Alternatively, the second direction DR2 may be a direction in which the upper side and the lower side of the pixel component 110 are connected to each other, or may indicate other directions.

The pixels PX may be disposed in the pixel component 110 to be electrically connected to the data lines DL1 to DLm and the scan lines SL1 to SLn. Here, the pixels PX may be sub-pixels. For example, the pixels PX may be disposed in various manners.

The pixels PX may be selected on a horizontal line basis {e.g., pixels PX connected to the same scan line may be grouped into one horizontal line (or a pixel row)} when a scan signal is supplied to the scan lines SL1 to SLn. Each of the pixels PX that are selected by the scan signal may receive a data signal from a corresponding data line (any one of DL1 to DLm) connected therewith. The pixels PX that receive data signals may generate light with certain luminances corresponding to voltages of the data signals.

The data driver 120 may receive output data Dout and a data driving signal DCS from the timing controller 140. The data driver 120 may generate data signals, based on the data driving signal DCS and the output data Dout. For example, the data driver 120 may generate an analog data signal, based on a grayscale value of the output data Dout. The data driver 120 may supply data signals in units of one horizontal period. The data driving signal DCS may include a data enable signal needed to drive the data driver 120.

The data enable signal may include an active period in which a plurality of pulses are supplied, and a blank period that maintains a constant voltage (e.g., a low voltage). The data driver 120 may supply data signals to the data lines DL1 to DLm during the active period in synchronization with pulses of a data enable signal.

The scan driver 130 may receive a scan driving control signal SCS from the timing controller 140. The scan driving signal SCS may include start signals FLM1 and FLM2 and clock signals S1_CK and S2_CK.

Figure 2:
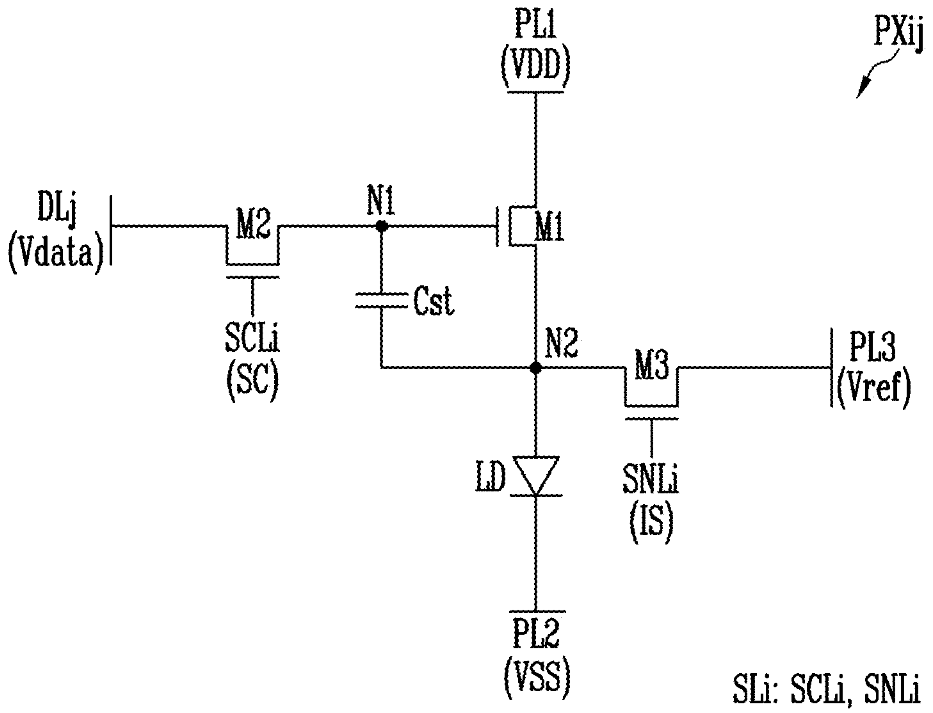
FIG. 2 is a circuit diagram illustrating an embodiment of a pixel shown in FIG. 1.

In an embodiment, each of the scan lines SL1 to SLn include a scan line SCL and an initialization line SNL, as illustrated in FIG. 2. The scan driver 130 may sequentially supply scan signals to the scan lines SCL in response to a first start signal FLM1 and a scan clock signal S1_CK. The scan driver 130 may sequentially supply initialization signals to the initialization lines SNL in response to a second start signal FLM2 and an initialization clock signal S2_CK.

For the aforementioned purpose, the scan driver 130 may include a first scan driver (not shown) configured to drive the scan lines SCL, and a second scan driver (not shown) configured to drive the initialization lines SNL. The first scan driver and the second scan driver may be formed as a single scan driver 130, as illustrated in FIG. 1, or may be formed as separate drivers. For example, the first scan driver and the second scan driver may be disposed to be spaced apart from each other with the pixel component 110 interposed therebetween.

In an embodiment, the scan driver 130 is disposed in the display device 100 as a separate integrated circuit (IC). In an embodiment, the scan driver 130 along with the pixels PX may be formed during a process of forming the pixel component 110. For example, the scan driver 130 may be formed in the pixel component 110 in an oxide semiconductor thin film transistor gate driver circuit (OSG) type or an amorphous silicon thin film transistor gate driver circuit (ASG) type.

The timing controller 140 may receive input data Din and a control signal CS from an external device (e.g., an application processor). The timing controller 140 may rearrange or modify the input data Din to match specifications of the display device 100. Furthermore, the timing controller 140 may correct the input data Din to generate output data Dout, and supply the output data Dout to the data driver 120. In an embodiment, the timing controller 140 may correct the input data Din in response to optical measurement results obtained during the manufacturing process.

The timing controller 140 may use the control signal CS to generate a data driving signal DCS and a scan driving signal SCS. The data driving signal DCS may be supplied to the data driver 120. The scan driving signal SCS may be supplied to the scan driver 130.

For example, the data driver 120, the scan driver 130, and the timing controller 140 may each be disposed in the display device 100 as an integrated circuit IC. For example, two or more components (e.g., the data driver 120 and the timing controller 140) may be included in one integrated circuit IC.

In an embodiment of the present disclosure, the display device 100 may include a planar display device, a curved display device in which a portion of the pixel component 110 is curved, a flexible display device a portion of which can be folded or bent, and a stretchable display device a portion of which can be stretched.

In an embodiment of the present disclosure, the display device 100 may be a device configured to display a video or a static image, and may include potable electronic devices such as a mobile phone, a smart phone, a tablet personal computer (a tablet PC), a smart watch, a watch phone, a mobile communication terminal, an electronic note, an electronic book, a potable multimedia player (PMP), a navigation device, and a ultra mobile PC (UMPC). In an embodiment of the present disclosure, the display device 100 may include electronic devices such as a television, a laptop, a monitor, an advertisement board, and an Internet of Things (IoT) device.

FIG. 2 is a circuit diagram illustrating an embodiment of a pixel PXij shown in FIG. 1. In FIG. 2, for the sake of explanation convenience, the pixel PXij positioned on an i-th horizontal line and a j-th vertical line is referenced.

Referring to FIG. 2, the pixel PXij in accordance with an embodiment of the present disclosure may include a light emitting element LD, and a pixel circuit configured to control the amount of current to be supplied to the light emitting element LD.

The light emitting element LD may include a first electrode (or an anode electrode) electrically connected to a first power line PL1 via a second node N2 and a first transistor M1, and a second electrode (or a cathode electrode) electrically connected to a second power line PL2. The light emitting element LD may generate light with a certain luminance corresponding to the amount of current supplied from the first transistor M1.

Here, a first driving power VDD may be supplied to the first power line PL1. A second driving power VSS may be supplied to the second power line PL2. During a period in which the pixel PXij emits light, the first driving power VDD has a high voltage value, compared to the second driving power VSS.

An organic light emitting diode may be selected as the light emitting element LD. Furthermore, an inorganic light emitting diode such as a micro light emitting diode (LED) or a quantum dot light emitting diode may be selected as the light emitting element LD. The light emitting element LD may be an element formed of a combination of organic material and inorganic material. Although FIG. 2 illustrates that the pixel PX includes a single light emitting element LD, the pixel PX in an embodiment may include a plurality of light emitting elements. The plurality of light emitting elements may be connected in series, parallel or series-parallel to each other.

The pixel circuit may include a first transistor M1, a second transistor M2, a third transistor M3, and a storage capacitor Cst.

A first electrode of the first transistor M1 may be connected to the first power line PL1, and a second electrode thereof may be connected or electrically connected to the second node N2. A gate electrode of the first transistor M1 may be connected to a first node N1. The first transistor M1 may control, in response to a voltage of the first node N1, the amount of current flowing from the first power line PL1 to the second power line PL2 via the light emitting element LD.

The second transistor M2 may be connected between a j-th data line DLj and the first node N1. A gate electrode of the second transistor M2 may be electrically connected to an i-th scan line SCLi. When a scan signal SC is supplied to the i-th scan line SCLi, the second transistor M2 may be turned on to electrically connect the j-th data line DLj to the first node N1. If the second transistor M2 is turned on, a data signal may be supplied from the j-th data line DLj to the first node N1.

The scan signal SC may have a gate-on voltage (e.g., having an enable level or first logic level) or a gate-off voltage (e.g., having a disable level or second other logic level). Hereinafter, the term "enable scan signal SC" may denote that a gate-on voltage is supplied to the scan line SCL. The term "disable scan signal SC" may denote that a gate-off voltage is supplied to the scan line SCL.

The third transistor M3 may be connected between the second node N2 and a third power line PL3. A gate electrode of the third transistor M3 may be electrically connected to an i-th initialization line SNLi. When an enable initialization signal IS is supplied to the i-th initialization line SNLi, the third transistor M3 may be turned on to electrically connect the second node N2 to the third power line PL3. If the third transistor M3 is turned on, a voltage of a reference power Vref may be supplied from the third power line PL3 to the second node N2. The reference power Vref may be supplied to the third power line PL3. The voltage of the reference power Vref may be set to turn off the light emitting element LD when supplied to the third node N3. A voltage difference between the reference power Vref and the second driving power VSS may be less than a threshold voltage of the light emitting element LD to turn off the light emitting element LD. For example, the voltage of the reference power Vref may be set to a voltage identical or similar to the second driving power VSS.

The initialization signal IS may have a gate-on voltage (e.g., having an enable level) or a gate-off voltage (e.g., having a disable level). Hereinafter, the term "enable initialization signal IS" may denote that a gate-on voltage is supplied to the initialization line SNL. The term "disable initialization signal IS" may denote that a gate-off voltage is supplied to the initialization line SNL.

Although in FIG. 2 each of the first to third transistors M1 to M3 is illustrated as being an N-type transistor, embodiments of the present disclosure are not limited thereto. For example, at least one transistor of the first to third transistors M1 to M3 may be implemented as a P-type transistor.

The storage capacitor Cst may be connected between the first node N1 and the second node N2. The storage capacitor Cst may store a voltage corresponding to a data signal. For example, the storage capacitor Cst may store a voltage corresponding to a difference in voltage between the data signal supplied to the first node N1 and the reference power Vref supplied to the second node N2.

Figure 3:
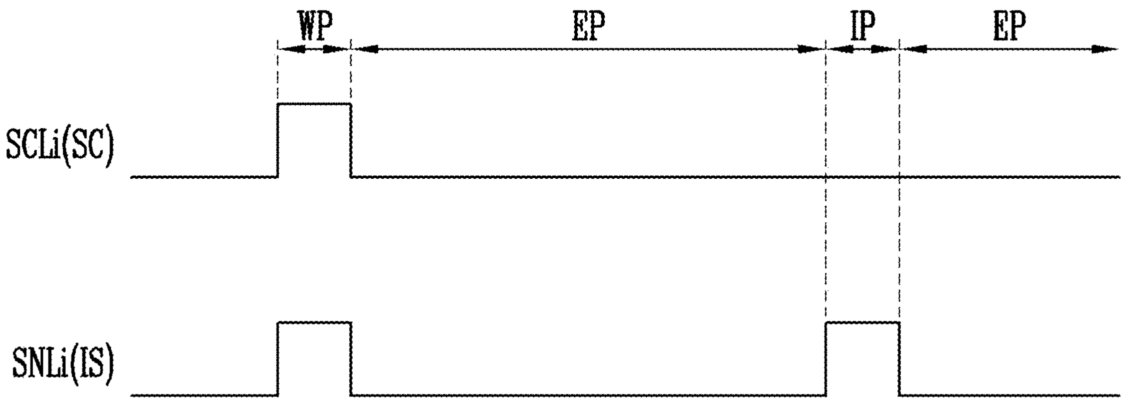
FIG. 3 is a waveform diagram illustrating an embodiment of a method of driving the pixel shown in FIG. 2.

FIG. 3 is a waveform diagram illustrating an embodiment of a method of driving the pixel shown in FIG. 2.

Referring to FIG. 3, one frame period may include a data write period WP, an emission period EP, and an initialization period IP. Here, the initialization period IP may be omitted or additionally included in correspondence with the length of one frame period (or a refresh rate).

During the data write period WP, a data signal corresponding to an image of a corresponding frame may be written to the pixel PXij. During the data write period WP, an enable scan signal SC may be supplied to the i-th scan line SCLi, and an enable initialization signal IS may be supplied to the i-th initialization line SNLi to write data to the pixel PXij. Here, the enable scan signal SC supplied to the i-th scan line SCLi and the enable initialization signal IS supplied to the i-th initialization line SNLi may overlap each other.

If the enable scan signal SC is supplied to the i-th scan line SCLi, the second transistor M2 is turned on. If the second transistor M2 is turned on, a data signal may be supplied from the data line DLj to the first node N1. For example, the second transistor M2 may be turned on by a pulse of the scan signal SC.

If the enable initialization signal IS is supplied to the i-th initialization line SNLi, the third transistor M3 is turned on. For example, the third transistor M3 may be turned on by a pulse of the initialization signal IS. If the third transistor M3 is turned on, the voltage of reference power Vref may be supplied to the second node N2. If the voltage of the reference power Vref is supplied to the second node N2, the light emitting element LD may be set to a non-emission state.

During the data write period WP, a voltage corresponding to a difference between the data signal and the reference power Vref may be stored in the storage capacitor Cst. Here, because the reference power Vref is maintained at a constant voltage, the voltage to be stored in the storage capacitor Cst may be determined by the voltage of the data signal.

During the emission period EP, a disable scan signal SC may be supplied to the i-th scan line SCLi, and a disable initialization signal IS may be supplied to the i-th initialization line SNLi. If the disable scan signal SC is supplied to the i-th scan line SCLi, the second transistor M2 may be turned off. For example, the second transistor M2 may be turned off by a low level of the scan signal SC. If the disable initialization signal IS is supplied to the i-th initialization line SNLi, the third transistor M3 may be turned off. For example, the third transistor M3 may be turned off by a low level pulse of the initialization signal IS.

Here, the first transistor M1 may control the amount of current flowing from the first power line PL1 to the second power line PL2 via the light emitting element LD in response to the voltage of the first node N1 (i.e., a voltage stored in the storage capacitor Cst). As a result, during the emission period EP, the light emitting element LD may generate light with a certain luminance.

During the initialization period IP, the pixel PXij may be set to a non-emission state. The enable initialization signal IS may be supplied to the i-th initialization line SNLi during the initialization period IP to set the pixel PXij to a non-emission state.

If the enable initialization signal IS is supplied to the i-th initialization line SNLi, the third transistor M3 is turned on. For example, the third transistor M3 may be turned on by a pulse of the initialization signal IS. If the third transistor M3 is turned on, the voltage of the reference power Vref may be supplied to the second node N2. If the voltage of the reference power Vref is supplied to the second node N2, the light emitting element LD may be set to a non-emission state.

During the emission period EP after the initialization period IP, the disable initialization signal IS is supplied to the i-th initialization line SNLi. As a result, the third transistor M3 may be turned off. For example, the third transistor M3 may be turned off by a low level of the initialization signal IS. Here, the first transistor M1 may control the amount of current flowing from the first power line PL1 to the second power line PL2 via the light emitting element LD in response to the voltage of the first node N1 (i.e., a voltage stored in the storage capacitor Cst). As a result, during the emission period EP, the light emitting element LD may generate light with a certain luminance.

Figure 4:
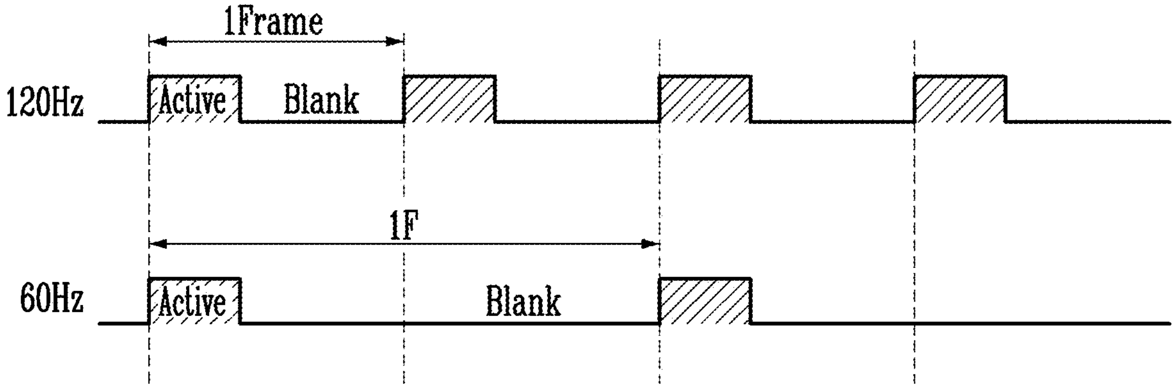
FIG. 4 is a diagram illustrating an example of a blank period corresponding to a refresh rate.
Figure 5A:
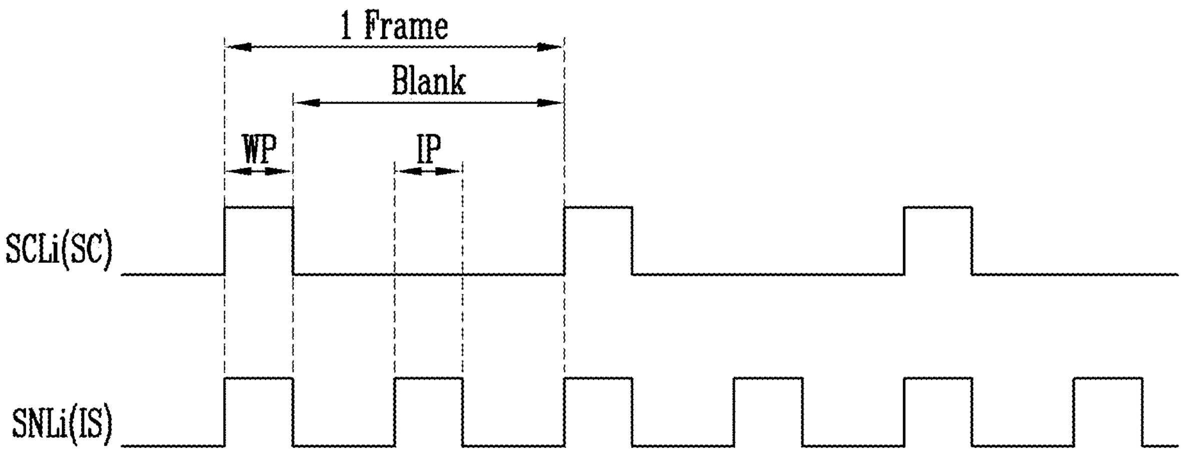
FIGS. 5A and 5B are diagrams illustrating an embodiment of an initialization period included in one frame period corresponding to the refresh rate.
Figure 5B:
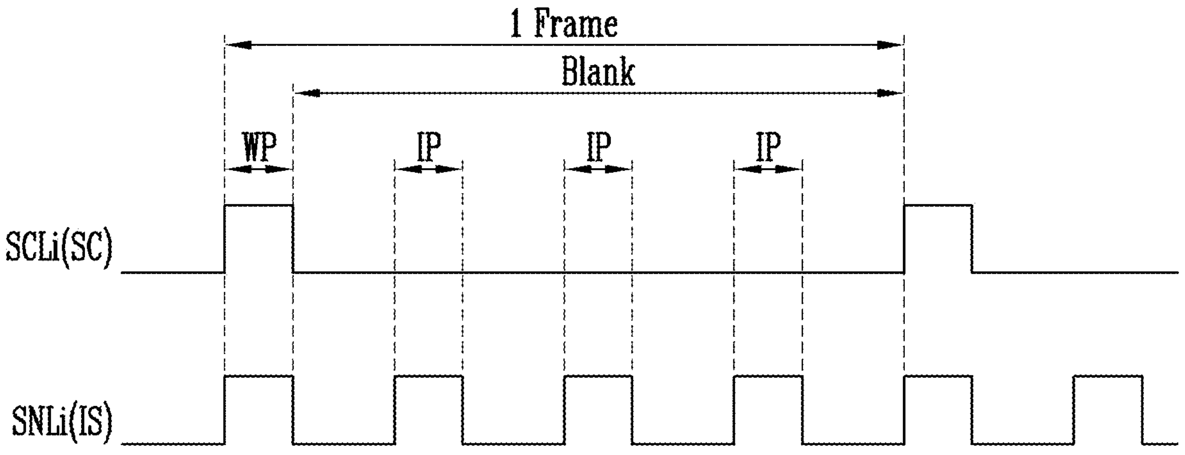

FIG. 4 is a diagram illustrating an example of a blank period corresponding to a refresh rate. FIGS. 5A and 5B are diagrams illustrating an embodiment of an initialization period IP included in one frame period corresponding to the refresh rate.

Referring to FIG. 4, in an embodiment, the length of the active period included in one frame period (1F) is set to the same value, regardless of the refresh rate (or a driving frequency). In this embodiment, the length of the blank period included in one frame period is set to different values or adjusted depending on the refresh rate.

For example, the active period included in a refresh rate of 120 Hz and the active period included in a refresh rate of 60 Hz may be set to the same length (or width, time). The active period may refer to a period in which a data signal is supplied during one frame period. The data write period WP may be included in the active period.

For example, the blank period included in the refresh rate of 120 Hz and the blank period included in the refresh rate of 60 Hz are set to different lengths (or widths, times). For example, the blank period when the refresh rate is 120 Hz may be shorter than the blank period when the refresh rate is 60 Hz. The initialization period IP may be included in the blank period.

For example, as illustrated in FIG. 5A, one initialization period IP may be included in the blank period in correspondence with the refresh rate of 120 Hz. As illustrated in FIG. 5B, three initialization periods IP may be included in the blank period in correspondence with the refresh rate of 60 Hz (here, the refresh rate in the case of FIG. 5A may be set to twice that of the case of FIG. 5B).

In an embodiment of the present disclosure, as illustrated in FIGS. 5A and 5B, the number of initialization periods IP included one frame period may be set to different values depending on the length of the blank period. For example, as the length of the blank period increases, the number of initialization periods IP included in one frame period may increase.

As a result, the pixels PX may be turned off in a cycle, regardless of the refresh rate (or regardless of the length of the blank period), thus leading to increased visibility of the display device 100.

Figure 6:
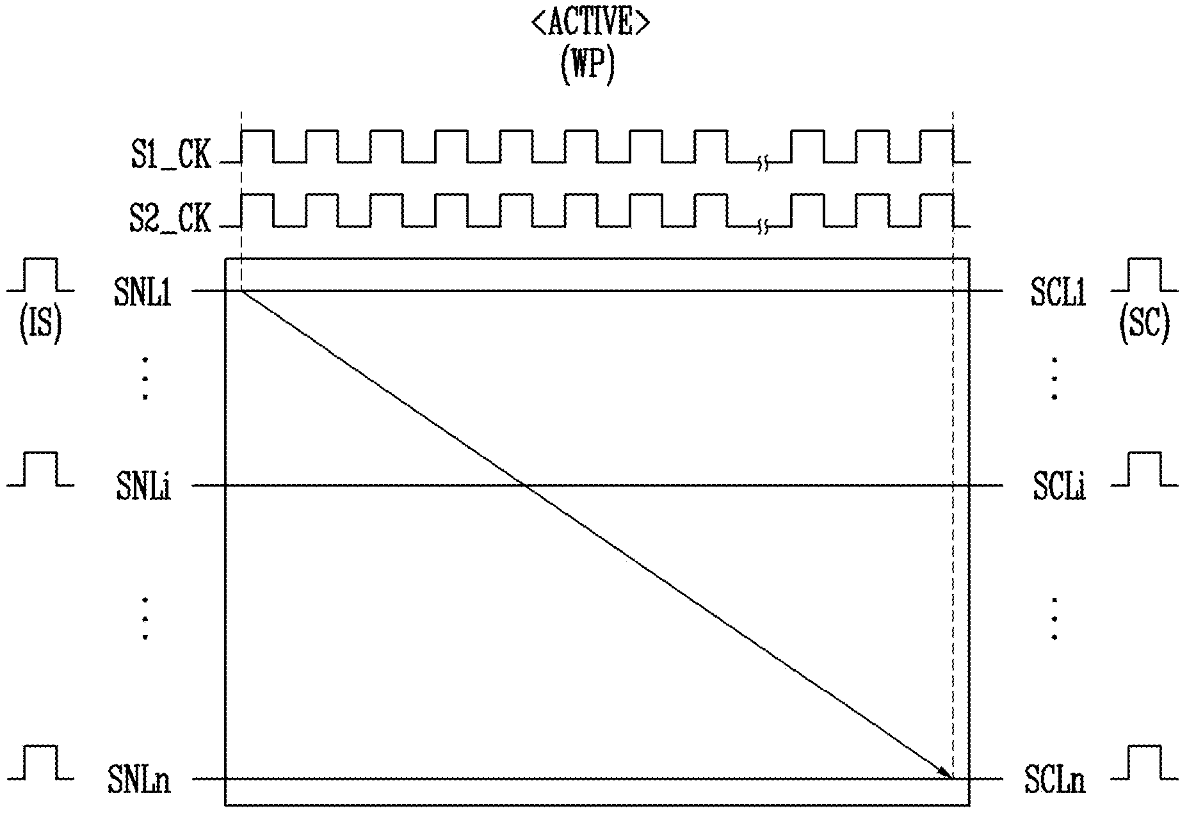
FIG. 6 is a diagram illustrating an embodiment of driving waveforms supplied during an active period of one frame.

FIG. 6 is a diagram illustrating an embodiment of a driving waveform supplied during the active period of one frame.

Referring to FIG. 6, the active period of one frame may include a data write period WP. During the data write period WP, scan signals SC may be sequentially supplied to the scan lines SCL1, . . . , SCLi, . . . , and SCLn, and initialization signals IS may be sequentially supplied to the initialization lines SNL1, . . . , SNLi, . . . , and SNLn.

The scan driver 130 may generate a scan signal SC using a scan clock signal S1_CK, and may generate an initialization signal IS using an initialization clock signal S2_CK.

The scan clock signal S1_CK may include a plurality of clock signals. The scan driver 130 may sequentially supply scan signals SC to the scan lines SCL1 to SCLn while shifting a first start signal FLM1 using the scan clock signal S1_CK.

The initialization clock signal S2_CK may include a plurality of clock signals. The scan driver 130 may sequentially supply initialization signals IS to the initialization lines SNL1 to SNLn while shifting a second start signal FLM2 using the initialization clock signal S2_CK.

Figure 7:
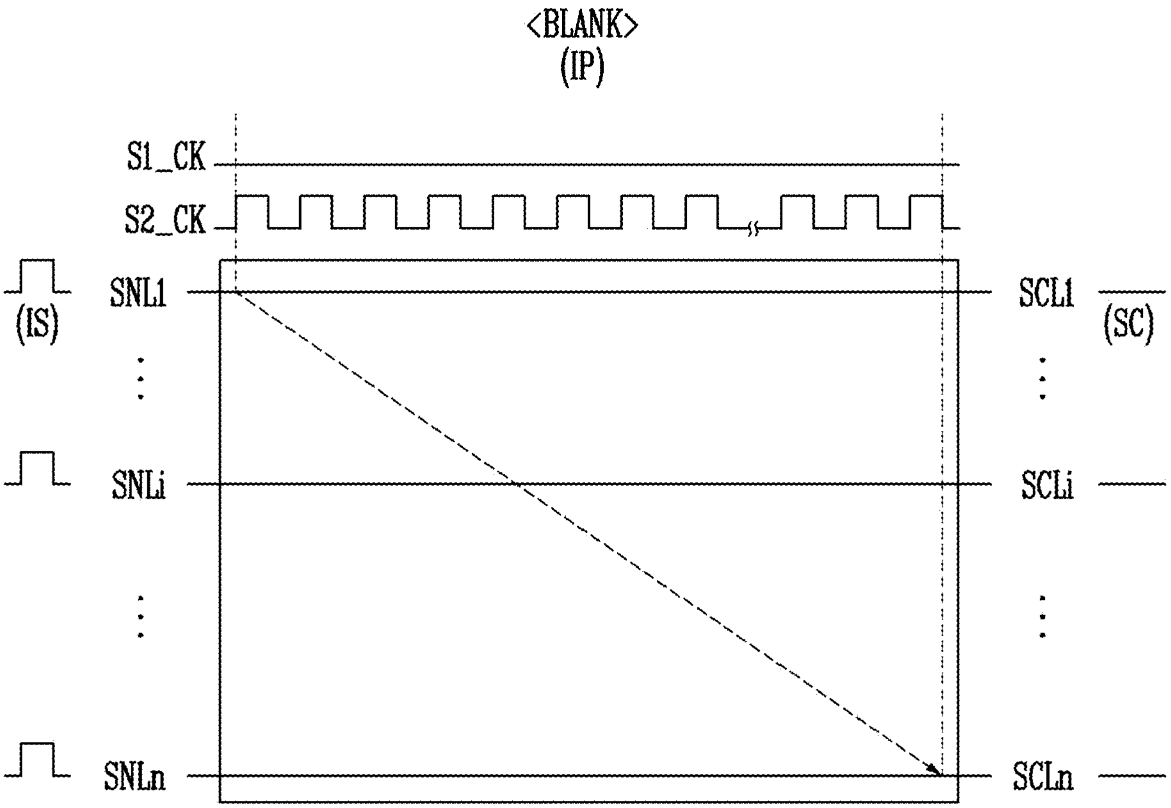
FIG. 7 is a diagram illustrating an embodiment of driving waveforms supplied during an initialization period of one frame.

FIG. 7 is a diagram illustrating an embodiment of driving waveforms supplied during an initialization period of one frame.

Referring to FIG. 7, the blank period of one frame may include an initialization period IP. During the initialization period IP, initialization signals IS may be sequentially supplied to the initialization lines SNL1, . . . , SNLi, . . . , and SNLn.

The scan driver 130 may generate an initialization signal IS using an initialization clock signal S2_CK. The initialization clock signal S2_CK may include a plurality of clock signals. The scan driver 130 may sequentially supply initialization signals IS to the initialization lines SNL1 to SNLn while shifting a second start signal FLM2 using the initialization clock signal S2_CK.

During the initialization period IP (or the blank period), disable scan signals SC may be supplied to the scan signals SCL1 to SCLn. For example, the scan signals SC may be set to a disabled state. For example, during the initialization period IP, the scan lines SCL1 to SCLn may maintain a constant voltage (e.g., a low voltage). In response to this, during the blank period, the scan clock signal S1_CK may maintain a constant voltage (e.g., a low voltage). Accordingly, power consumption may be reduced.

Figure 8:
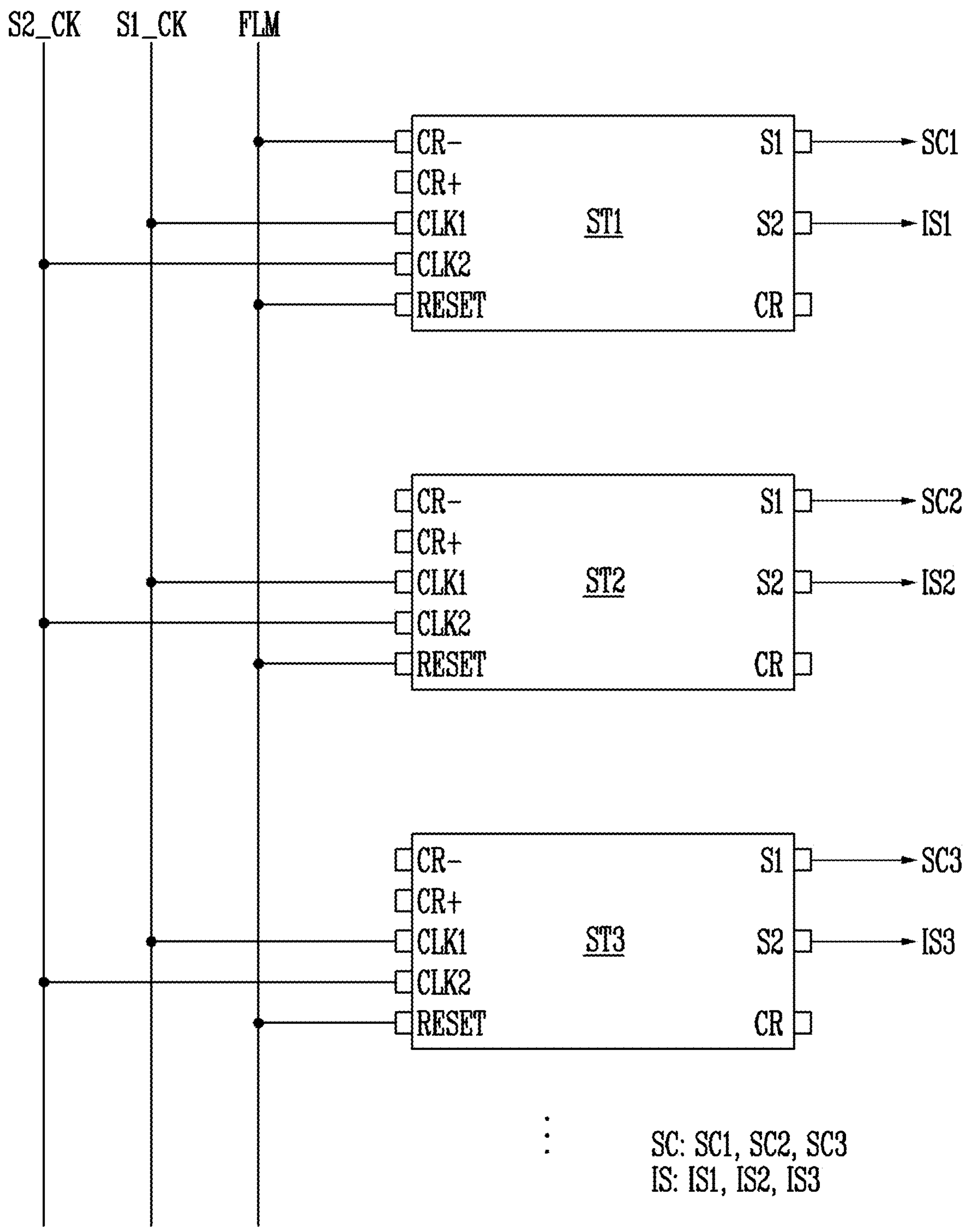
FIG. 8 is a diagram illustrating a stage included in a scan driver in accordance with a comparative example.

FIG. 8 is a diagram illustrating a stage included in a scan driver in accordance with a comparative example. In FIG. 8, for the sake of explanation convenience, only one scan clock signal S1_CK and one initialization clock signal S2_CK are illustrated. In FIG. 8, for the sake of explanation convenience, three stages ST1, ST2, and ST3 are illustrated.

Referring to FIG. 8, each of the stages ST1, ST2, and ST3 include a first input terminal CR−, a second input terminal CR+, a third input terminal CLK1, a fourth input terminal CLK2, a reset input terminal RESET, a first output terminal S1, a second output terminal S2, and a carry output terminal CR.

The first input terminal CR− may receive a carry signal (or a start signal FLM) from a preceding stage. In response to this, the scan driver in accordance with the comparative example further includes a plurality of first dummy stages. The first dummy stage may be positioned in a stage preceding the first stage ST1.

The second input terminal CR+ may receive a carry signal of from a subsequent stage. In response to this, the scan driver in accordance with the comparative example further includes a plurality of second dummy stages. The second dummy stage may be positioned in a stage subsequent to a last stage.

The third input terminal CLK1 may receive the scan clock signal S1_CK. The stages ST1 to ST3 that have received the scan clock signal S1_CK may sequentially output enable scan signals SC1, SC2, and SC3 through the respective first output terminals S1.

The fourth input terminal CLK2 may receive the initialization clock signal S2_CK. The stages ST1 to ST3 that have received the initialization clock signal S2_CK may sequentially output enable initialization signals IS1, IS2, and IS3 through the respective second output terminals S2.

The reset input terminal RESET may be supplied with the start signal FLM. When the start signal FLM is supplied to the reset input terminal RESET, the stages ST1 to ST3 may be initialized.

The first output terminal S1 may output a scan signal SC. The second output terminal S2 may output an initialization signal IS. The carry output terminal CR may output a carry signal to a stage of a preceding set and a stage of a subsequent set.

Figure 9:
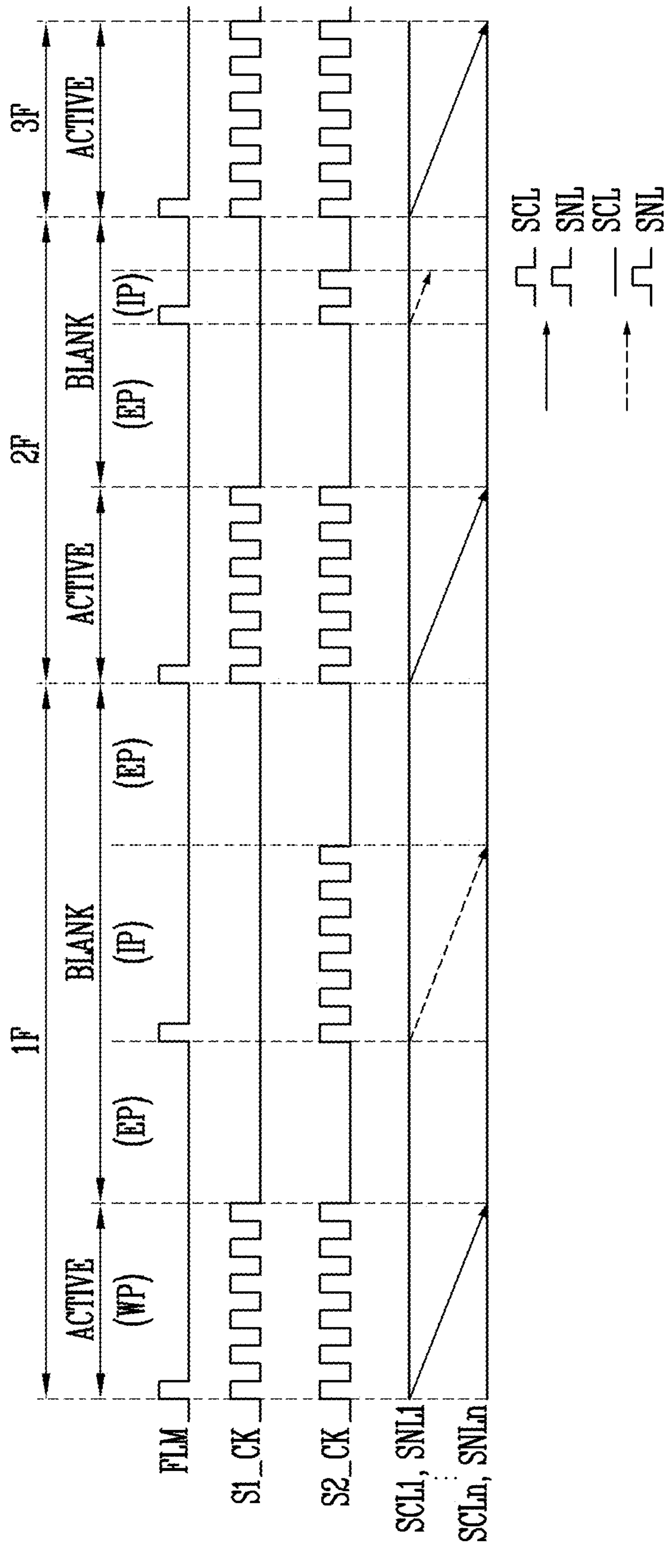
FIG. 9 is a diagram illustrating driving waveforms supplied by stages illustrated in FIG. 8.

FIG. 9 is a diagram illustrating driving waveforms supplied by stages illustrated in FIG. 8.

Referring to FIG. 9, during the active period (or the data write period WP) of a first frame 1F, scan signals SC are sequentially supplied to the scan lines SCL1 to SCLn, and initialization signals IS are sequentially supplied to the initialization lines SNL1 to SNLn. Here, voltages corresponding to data signals may be stored in the pixels PX. During the active period of the first frame 1F, each of the scan clock signal S1_CK and the initialization clock signal S2_CK are supplied in the form of a pulse.

The blank period of the first frame 1F may include an emission period EP and an initialization period IP.

During the emission period EP, each of the pixels PX may generate light with a luminance corresponding to a data signal stored during the data write period WP. During the emission period EP, each of the scan clock signal S1_CK and the initialization clock signal S2_CK maintain a constant voltage (e.g., a low voltage).

During the initialization period IP, initialization signals IS may be sequentially supplied to the initialization lines SNL1 to SNLn. Consequently, the pixels PX may be sequentially set to a non-emission state. During the initialization period IP, the scan clock signal S1_CK maintains a constant voltage (e.g., a low voltage), and the initialization clock signal S2_CK is supplied in the form of a pulse.

During the initialization period IP of the first frame 1F, initialization signals IS may be supplied to all of the initialization lines SNL1 to SNLn. In this case, the pixels PX included in the pixel component 110 may display images while being non-emissive in a cycle.

The active period of a second frame 2F may be the same as the active period of the first frame 1F; therefore, redundant explanation thereof will be omitted.

The blank period of the second frame 2F may include an emission period EP and an initialization period IP. The emission period EP may be the same as the emission period of the first frame 1F; therefore, redundant explanation thereof will be omitted.

During the initialization period IP of the second frame 2F, after the initialization signals IS are supplied to some initialization lines, a transition from the second frame 2F to a third frame 3F may occur. In this case, the initialization signals IS are supplied to some initialization lines, while no initialization signal IS is supplied to the other initialization lines.

For example, when a transition from the second frame 2F to the third frame 3F occurs, a start signal FLM may be supplied, and the stages ST1 to ST3 illustrated in FIG. 8 may be initialized by the start signal FLm. If the stages ST1 to ST3 are initialized, initialization signals IS need not be supplied to the other initialization lines. That is, the initialization period IP of the second frame 2F is set to a relatively short time, so that initialization signals IS are supplied to some initialization lines while initialization signals cannot be supplied to the other initialization lines. For example, the initialization period IP of the second frame 2F is set to be smaller than the initialization period IP of the first frame 1F.

In other words, in the scan driver according to the comparative example, initialization signals IS cannot be supplied to some initialization lines during the initialization period IP in correspondence with the length of the blank period. In other words, luminance differences may occur in an image displayed on the pixel component 110.

Figure 10:
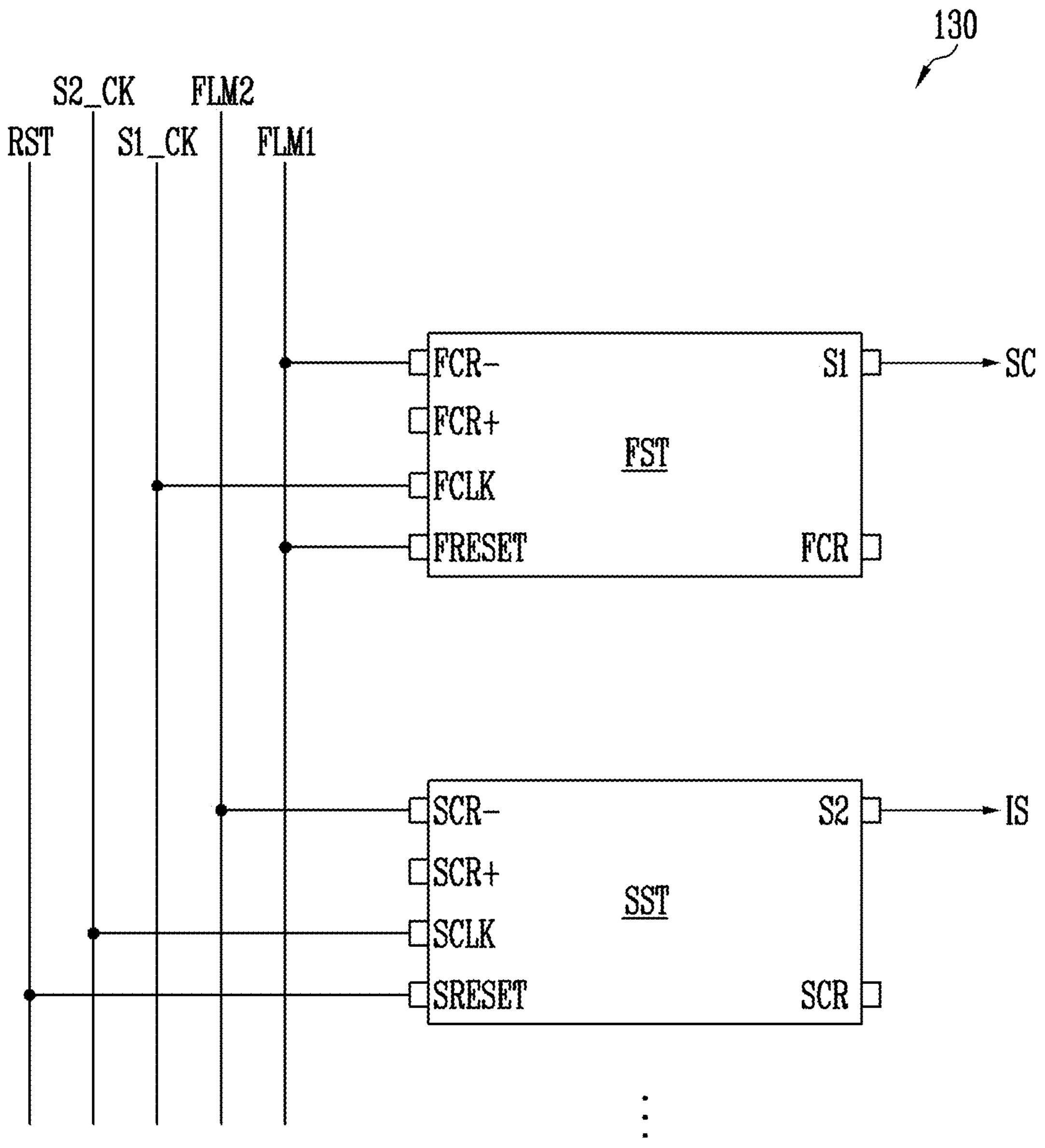
FIG. 10 is a diagram illustrating a scan driver in accordance with an embodiment of the present disclosure.

FIG. 10 is a diagram illustrating a scan driver 130 in accordance with an embodiment of the present disclosure. In FIG. 10, for the sake of explanation convenience, only one scan clock signal S1_CK and one initialization clock signal S2_CK are illustrated. In FIG. 10, one first stage FST and one second stage SST are illustrated.

Referring to FIG. 10, the scan driver 130 in accordance with an embodiment of the present disclosure may include a first stage FST and a second stage SST. However, the scan driver 130 is not limited to two stages and may include more than two stages in other embodiments.

The first stage FST includes a first carry input terminal FCR−, a second carry input terminal FCR+, a scan clock input terminal FCLK, a first reset input terminal FRESET, a first output terminal S1, and a first carry output terminal FCR.

The first carry input terminal FCR− may receive a carry signal (or a first start signal FLM1) from a first stage of a preceding set of stages. Accordingly, the scan driver 130 in accordance with an embodiment of the present disclosure may include at least one preceding first dummy stage provided in a set of stages preceding the first stage FST.

The second carry input terminal FCR+ may receive a carry signal from a first stage of a subsequent set of stages. Accordingly, the scan driver 130 in accordance with an embodiment of the present disclosure may further include at least one subsequent first dummy stage provided in a set of stages subsequent to the first stage FST.

The scan clock input terminal FCLK may receive the scan clock signal S1_CK. The first stage FST may output a scan signal SC through the first output terminal S1 in response to the scan clock signal S1_CK. For example, the first stage FST may output an on-duty voltage (e.g., a high voltage) of the scan clock signal S1_CK as the scan signal SC through the first output terminal S1.

The first reset input terminal FRESET may receive a reset signal. In the case where the reset signal is inputted, the first stage FST may be initialized. In an embodiment, the first start signal FLM1 may be inputted as the reset signal to the first reset input terminal FRESET.

The first output terminal S1 may output the scan signal SC. The first carry output terminal FCR may output a carry signal to the first stage of the preceding set of stages and the first stage of the subsequent set of stages.

The second stage SST may include a first carry input terminal SCR−, a second carry input terminal SCR+, an initialization clock input terminal FCLK, a second reset input terminal SRESET, a second output terminal S2, and a second carry output terminal SCR.

The first carry input terminal SCR− may receive a carry signal (or a second start signal FLM2) from a second stage of the preceding set of stages. Accordingly, the scan driver 130 in accordance with an embodiment of the present disclosure may include at least one preceding second dummy stage provided in a set of stages preceding the second stage SST.

The second carry input terminal SCR+ may receive a carry signal of a second stage from the subsequent set of stages. Accordingly, the scan driver 130 in accordance with an embodiment of the present disclosure may include at least one subsequent second dummy stage provided in a set of stages subsequent to the second stage SST.

The initialization clock input terminal SCLK may receive the initialization clock signal S2_CK. The second stage SST may output an initialization signal IS through the second output terminal S2 in response to the initialization clock signal S2_CK. For example, the second stage SST may output an on-duty voltage (e.g., a high voltage) of the initialization clock signal S2_CK as the initialization signal IS through the second output terminal S2.

The second reset input terminal SRESET may receive a reset signal RST. In the case where the reset signal RST is inputted, the second stage SST may be initialized. The reset signal RST may be supplied as a signal different from the start signals FLM1 and FLM2.

Therefore, even when the start signals FLM1 and FLM2 are supplied, the second stage SST may not be initialized.

The second output terminal S2 may output an initialization signal IS. The second carry output terminal SCR may output a carry signal to the second stage of the preceding set of stages and the second stage of the subsequent set of stages.

Figure 11:
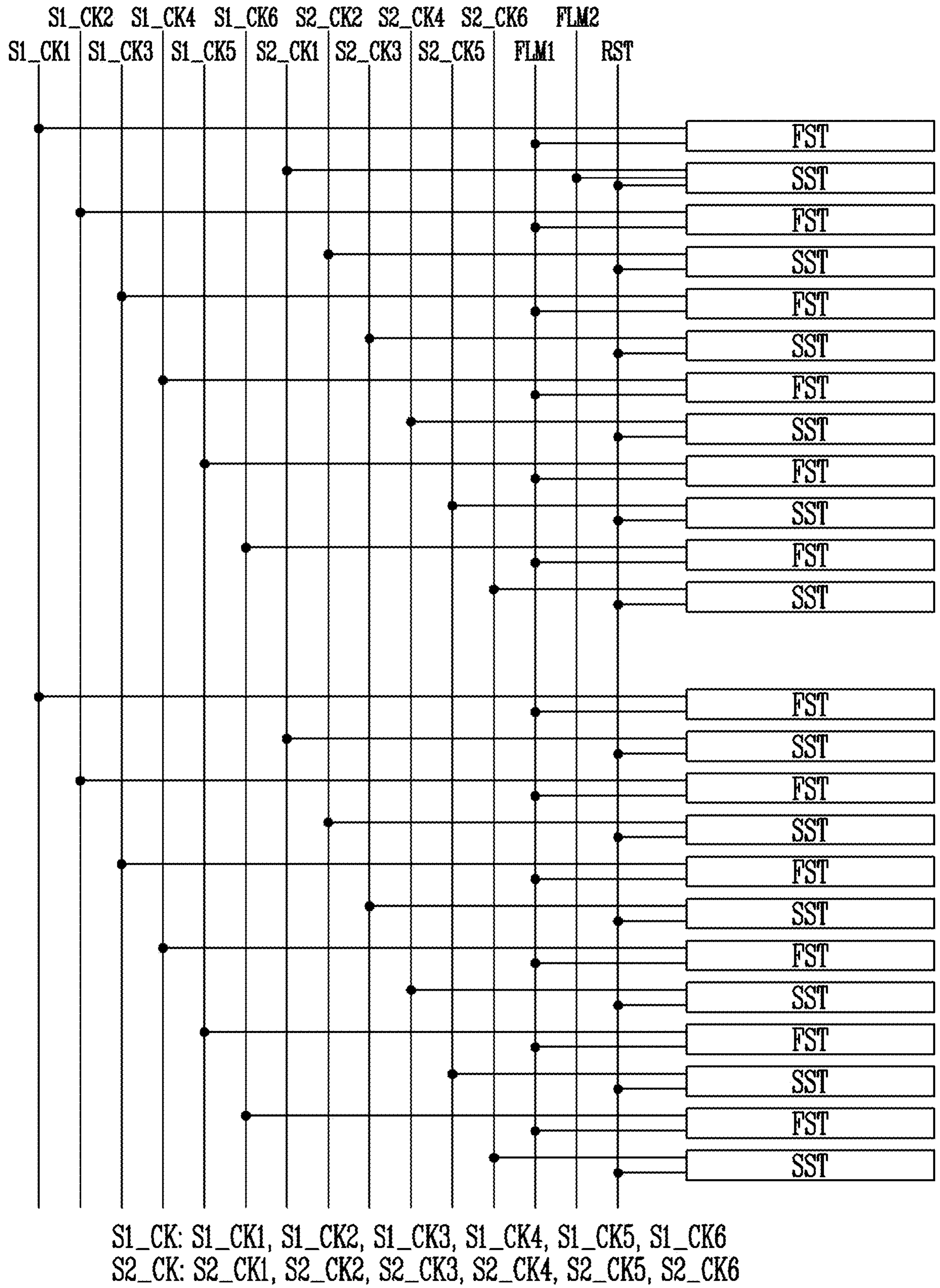
FIG. 11 is a diagram illustrating a scan driver in accordance with an embodiment of the present disclosure.

FIG. 11 is a diagram illustrating the scan driver 130 in accordance with an embodiment of the present disclosure.

Referring to FIG. 11, the scan clock signal S1_CK may include a plurality of scan clock signals S1_CK1, S1_CK2, S1_CK3, S1_CK4, S1_CK5, and S1_CK6. In an embodiment, the scan clock signals S1_CK1 to S1_CK6 have the same cycle, and have signals with shifted phases. The scan clock signals S1_CK1 to S1_CK6 may be sequentially supplied to first stages FST.

The initialization clock signal S2_CK may include a plurality of initialization clock signals S2_CK1, S2_CK2, S2_CK3, S2_CK4, S2_CK5, and S2_CK6. In an embodiment, the initialization clock signals S2_CK1 to S2_CK6 have the same cycle, and have signals with shifted phases. The initialization clock signals S2_CK1 to S2_CK6 may be sequentially supplied to second stages SST.

During the active period of one frame, the first scan clock signal S1_CK1 and the first initialization clock signal S2_CK1 may have the same cycle and phase. Furthermore, the second scan clock signal S1_CK2 may have the same cycle and phase as the second initialization clock signal S2_CK2. The third scan clock signal S1_CK3 may have the same cycle and phase as the third initialization clock signal S2_CK3. Likewise, the fourth scan clock signal S1_CK4 may have the same cycle and phase as the fourth initialization clock signal S2_CK4. The fifth scan clock signal S1_CK5 may have the same cycle and phase as the fifth initialization clock signal S2_CK5. Furthermore, the sixth scan clock signal S1_CK6 may have the same cycle and phase as the sixth initialization clock signal S2_CK6.

The scan driver 130 may include a plurality of first stages FST and a plurality of second stages SST. The first stages FST may alternate with the second stages SST.

Each of the first stages FST may be supplied with any one scan clock signal among the scan clock signals S1_CK1 to S1_CK6 (i.e., any one of S1_CK1 to S1_CK6). For example, the first stage FST positioned first may be supplied with the first scan clock signal S1_CK1. The first stage FST positioned second may be supplied with the second scan clock signal S1_CK2. For example, the first stage FST positioned third may be supplied with the third scan clock signal S1_CK3. The first stage FST positioned fourth may be supplied with the fourth scan clock signal S1_CK4. For example, the first stage FST positioned fifth may be supplied with the fifth scan clock signal S1_CK5. The first stage FST positioned sixth may be supplied with the sixth scan clock signal S1_CK6.

Each of the second stages SST may be supplied with any one initialization clock signal among the initialization clock signals S2_CK1 to S2_CK6 (i.e., any one of S2_CK1 to S2_CK6). For example, the second stage SST positioned first may be supplied with the first initialization clock signal S2_CK1. The second stage SST positioned second may be supplied with the second initialization clock signal S2_CK2. For example, the second stage SST positioned third may be supplied with the third initialization clock signal S2_CK3. The second stage SST positioned fourth may be supplied with the fourth initialization clock signal S2_CK4. For example, the second stage SST positioned fifth may be supplied with the fifth initialization clock signal S2_CK5. The second stage SST positioned sixth may be supplied with the sixth initialization clock signal S2_CK6.

During the active period, in an embodiment, the enable scan signal SC supplied to the first scan line SCL1 and the enable initialization signal IS supplied to the first initialization line SNL1 overlap each other.

During the emission period EP in the blank period of one frame, in this embodiment, each of the scan clock signals S1_CK1 to S1_CK6 and the initialization clock signals S2_CK1 to S2_CK6 maintain a constant voltage (e.g., a low voltage). In this case, the power consumption due to supply of the clock signals S1_CK and S2_CK may be reduced.

During the initialization period IP in the blank period of one frame, in this embodiment, each of the scan clock signals S1_CK1 to S1_CK6 maintain a constant voltage (e.g., a low voltage). During the initialization period IP in the blank period of one frame, in this embodiment, each of the initialization clock signals S2_CK1 to S2_CK6 are supplied in the form of a pulse. Accordingly, during the initialization period IP, initialization signals IS may be supplied to the initialization lines SNL1 to SNLn.

Figure 12:
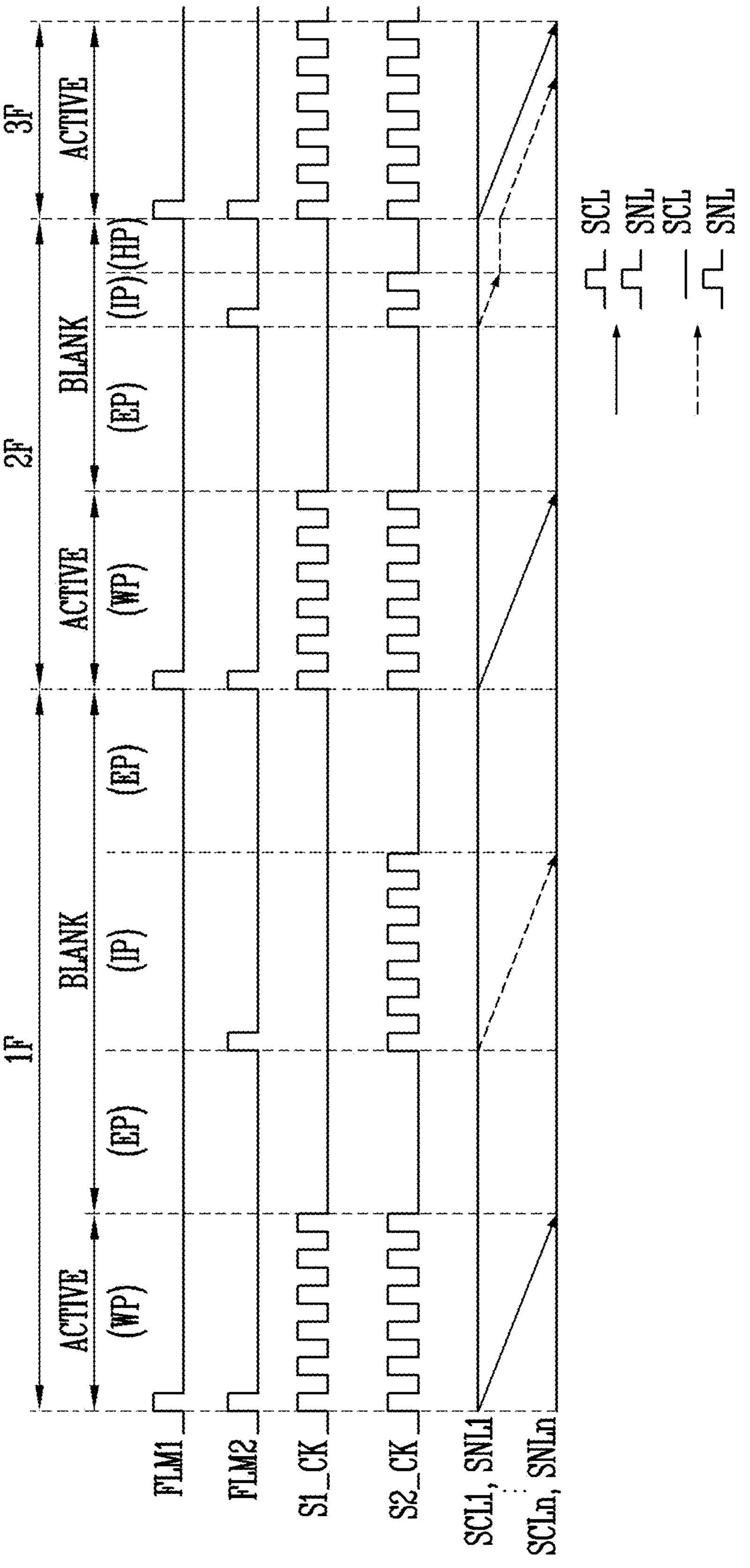
FIG. 12 is a diagram illustrating driving waveforms supplied by stages illustrated in FIGS. 10 and 11.

FIG. 12 is a diagram illustrating driving waveforms supplied by the stages illustrated in FIGS. 10 and 11.

Referring to FIG. 12, the active period of each frame 1F, 2F, or 3F includes a data write period WP.

During the active period of each frame 1F, 2F, or 3F, a first start signal FLM1 and a pulse-type scan clock signal S1_CK are supplied. Here, the first stage FST may sequentially supply enable scan signals SC to the scan lines SCL1 to SCLn.

During the active period of each frame 1F, 2F, or 3F, a second start signal FLM2 and a pulse-type scan clock signal S2_CK are supplied. Here, the second stage SST may sequentially supply enable initialization signals IS to the initialization lines SNL1 to SNLn.

In an embodiment, the enable scan signal SC supplied to the first scan line SCL1 and the enable initialization signal IS supplied to the first initialization line SNL1 overlap each other. In this embodiment, the enable scan signal SC supplied to the n-th scan line SCLn and the enable initialization signal IS supplied to the n-th initialization line SNLn overlap each other.

During the data write period WP, the voltage of the data signal may be stored in the pixels PX on a horizontal line basis. During the emission period EP of each frame 1F, 2F, or 3F, each of the pixels PX may generate light with a luminance corresponding to the data signal stored during the data write period WP. During the emission period EP, each of the scan clock signal S1_CK and the initialization clock signal S2_CK maintain a constant voltage (e.g., a low voltage).

During the initialization period IP of each frame 1F, 2F, or 3F, a second start signal FLM2 and a pulse-type scan clock signal S2_CK are supplied. The second stages SST may sequentially output initialization signals IS. Consequently, the pixels PX may be sequentially set to a non-emission state on a horizontal line basis. During the initialization period IP, the scan clock signal S1_CK maintains a constant voltage (e.g., a low voltage).

Figure 13A:
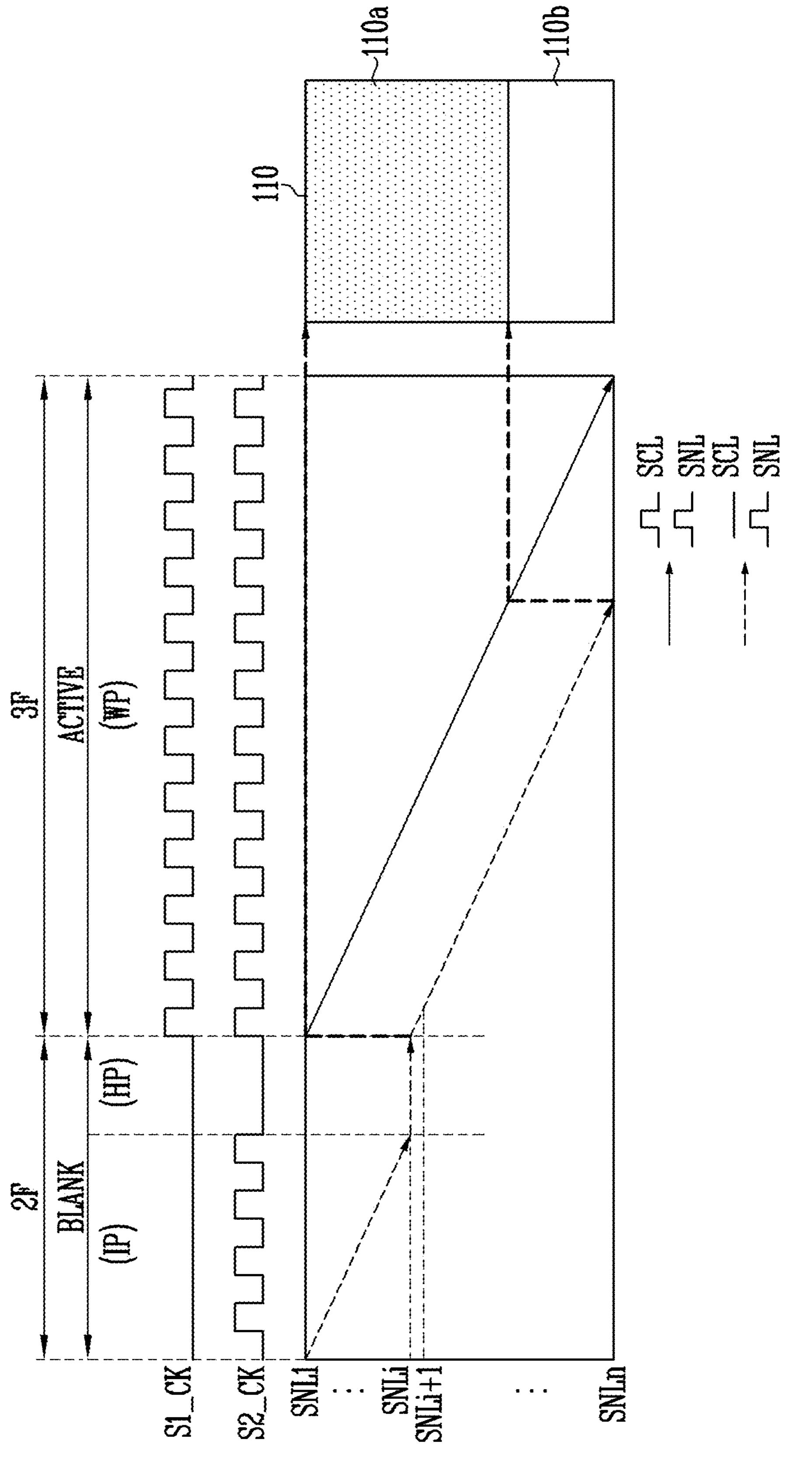
FIGS. 13A and 13B are diagrams illustrating in detail a period between a second frame and a third frame shown in FIG. 12.
Figure 13B:
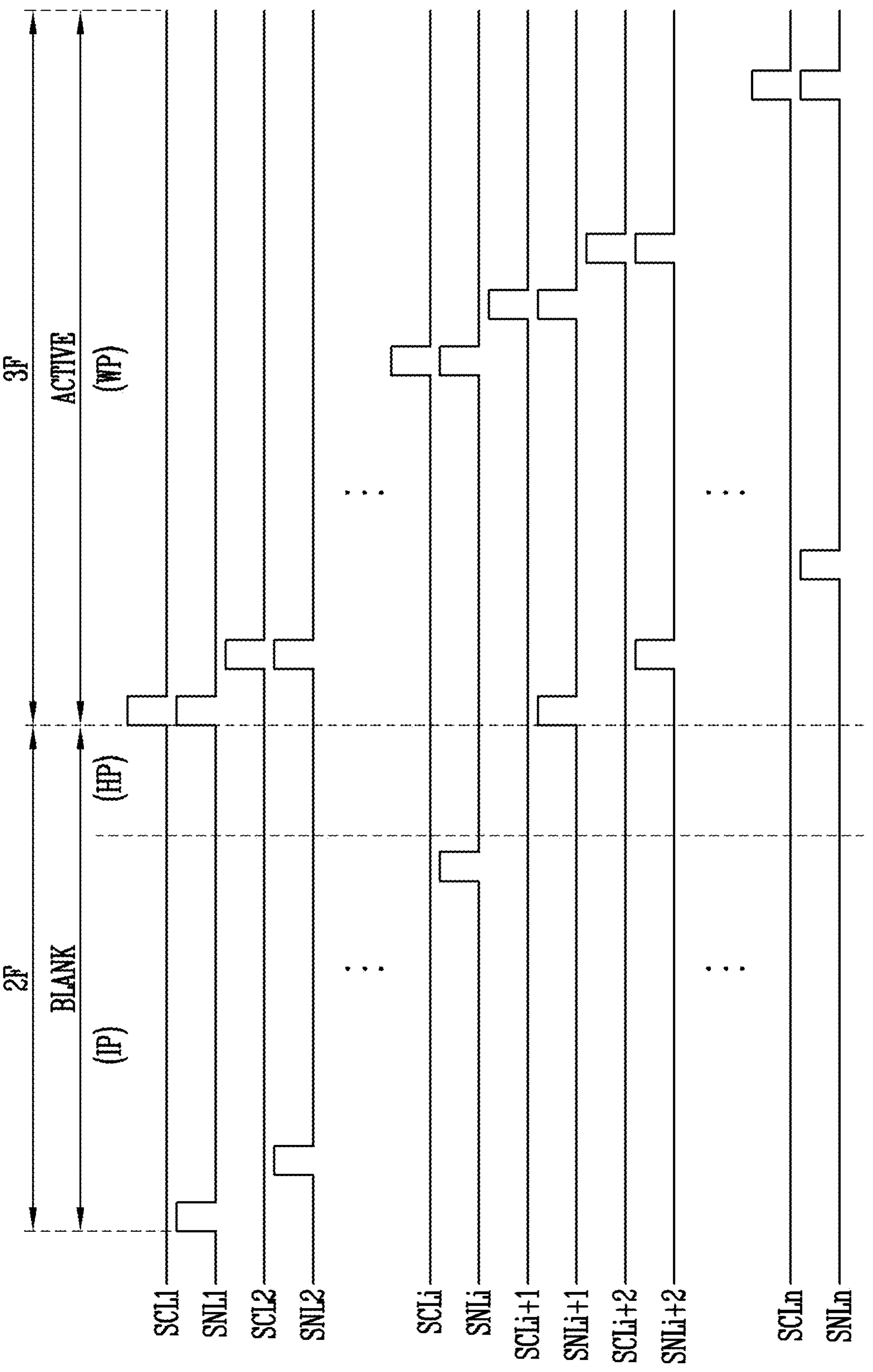

FIGS. 13A and 13B are diagrams illustrating in detail a period between the second frame 2F and the third frame 3F shown in FIG. 12.

Referring to FIGS. 13A and 13B, during the initialization period IP of the second frame 2F, after the initialization signals IS are supplied to some initialization lines, a transition from the second frame 2F to a third frame 3F may occur.

For example, during the initialization period IP of the second frame 2F, after the initialization signals IS are supplied to the first to i-th initialization lines SNL1 to SNLi, a holding period HP may follow, and then the third frame 3F may start.

Here, the holding period HP may be a preparation period for supplying the scan signal SC and the initialization signal IS. For example, as illustrated in FIG. 11, the scan driver 130 may be supplied with a plurality of scan clock signals S1_CK1 to S1_CK6 and a plurality of initialization clock signals S2_CK1 to S2_CK6. Here, after the start of the third frame 3F, a timing of supplying the initialization clock signals S2_CK1 to S2_CK6 needs to be controlled to allow the initialization signal IS to be supplied to the first initialization line SNL1, and this period may be referred to as the holding period HP. During the holding period HP, in an embodiment, each of the scan clock signal S1_CK and the initialization clock signal S2_CK maintain a constant voltage (e.g., a low voltage).

During the active period of the third frame 3F, a first start signal FLM1 and a pulse-type scan clock signal S1_CK may be supplied. Here, the first stages FST may sequentially output enable scan signals SC. During the active period of the third frame 3F, a second start signal FLM2 and a pulse-type initialization clock signal S2_CK may be supplied. Here, the second stages SST may sequentially output initialization signals IS.

In addition, because the second stages SST have not been initialized by the second start signal FLM2, the i-th second stage SST may maintain the carry signal. Therefore, during the active period of the third frame 3F, the initialization signals IS may be sequentially supplied to the i+1-th to n-th initialization lines SNLi+1 to SNLn. In other words, during the initialization period IP of the second frame 2F, the initialization signal IS is supplied up to the i-th initialization line SNLi, and thereafter, during the holding period HP, the supply of the initialization signal IS is interrupted. When the active period of the third frame 3F starts, the initialization signals IS may be sequentially supplied to the i+1-th to n-th initialization lines SNLi+1 to SNLn. In an embodiment, during the active period of the third frame 3F, the enable initialization signals are supplied to two initialization lines in an overlapping manner. For example, as shown in FIG. 13B, the enable initialization signal supplied to initialization line SNL1 overlaps with the enable initialization signal supplied to initialization line SNLi+1 during the active period of the third frame 3F.

In other words, in an embodiment of the present disclosure, even if the frame changes during the initialization period IP, it is possible to supply the initialization signal IS to a subsequent frame. As a result, the display quality of the display device 100 may increase compared to the case of FIG. 9.

In an embodiment, the initialization signal IS supplied to the i+1-th initialization line SNLi+1 in correspondence with the initialization period IP overlaps the scan signal SC supplied to the first scan line SCL1 and the initialization signal IS supplied to the first initialization line SNL1 in correspondence with the data write period WP. In this case, the voltage of the reference power Vref may be supplied to the pixels positioned on a first horizontal line and the pixels positioned on an i+1-th horizontal line. In other words, during a period of the third frame 3F, the pixels positioned in an area where the initialization period IP and the data write period WP overlap each other (e.g., the pixels positioned in a first area 110*a* shown in FIG. 13A) may each store a voltage of a data signal in correspondence with reference power Vref of a first voltage.

In the case where the initialization period IP and the data write period WP do not overlap each other during the period of the third frame 3F, the voltage of the reference power Vref may be supplied to pixels positioned on one horizontal line. For example, the pixels positioned in a second area 110*b* shown in FIG. 13A may store a voltage of a data signal in correspondence with the reference power Vref of a second voltage different from the first voltage.

In this case, even when the same data signal is supplied during the period of the third frame 3F, images having different luminances may be displayed in the first area 110*a* and the second area 110*b*. For example, in response to the same data signal, a darker image may be displayed in the first area 110*a*, compared to the second area 110*b*.

Figure 14:
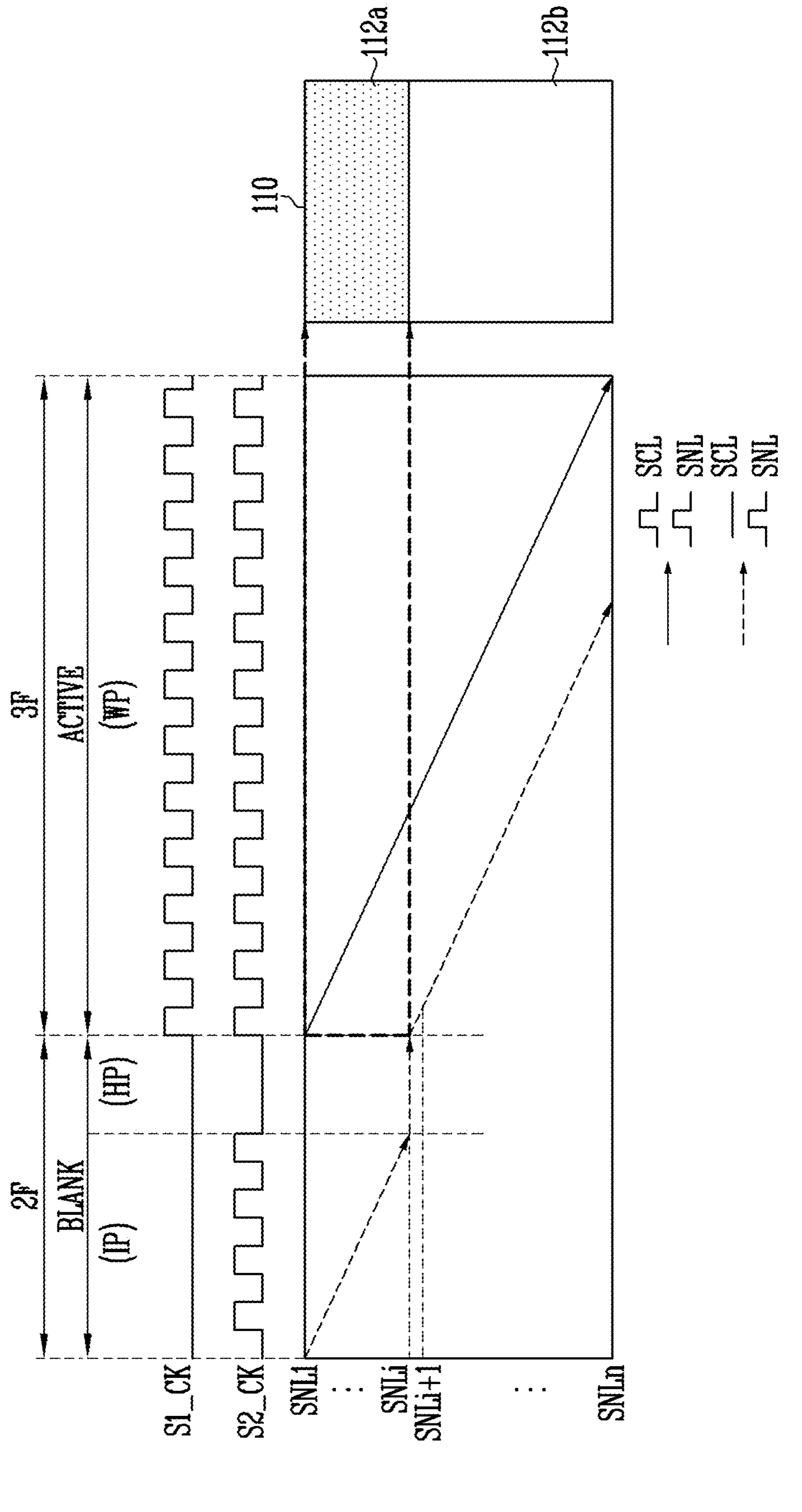
FIG. 14 is a diagram illustrating a period between a second frame and a third frame shown in FIG. 12.

FIG. 14 is a diagram illustrating a period between the second frame and the third frame shown in FIG. 12. In the following description of FIG. 14, explanations that overlap the description of FIGS. 13A and 13B will be omitted.

Referring to FIG. 14, during the initialization period IP of the second frame 2F, the initialization signals IS may be sequentially supplied to the initialization lines SNL1 to SNLi. In an embodiment, after the frame is changed (i.e., to the third frame 3F), the initialization signals IS are supplied to the initialization lines SNLi+1 to SNLn after a certain delay time (e.g., a holding period HP).

In this case, there may be a luminance difference between pixels supplied with the initialization signals IS during the initialization period IP of the second frame 2F (e.g., the pixels positioned in a first area 112*a* shown in FIG. 14) and pixels supplied with the initialization signals IS (e.g., the pixels positioned in a second area 112*b* shown in FIG. 14) after the frame is changed (i.e., to the third frame 3F). For example, even if the same data signal is supplied during the period of the second frame 2F, a darker image may be displayed in the first area 112*a*, compared to the second area 112*b*.

Figure 15:
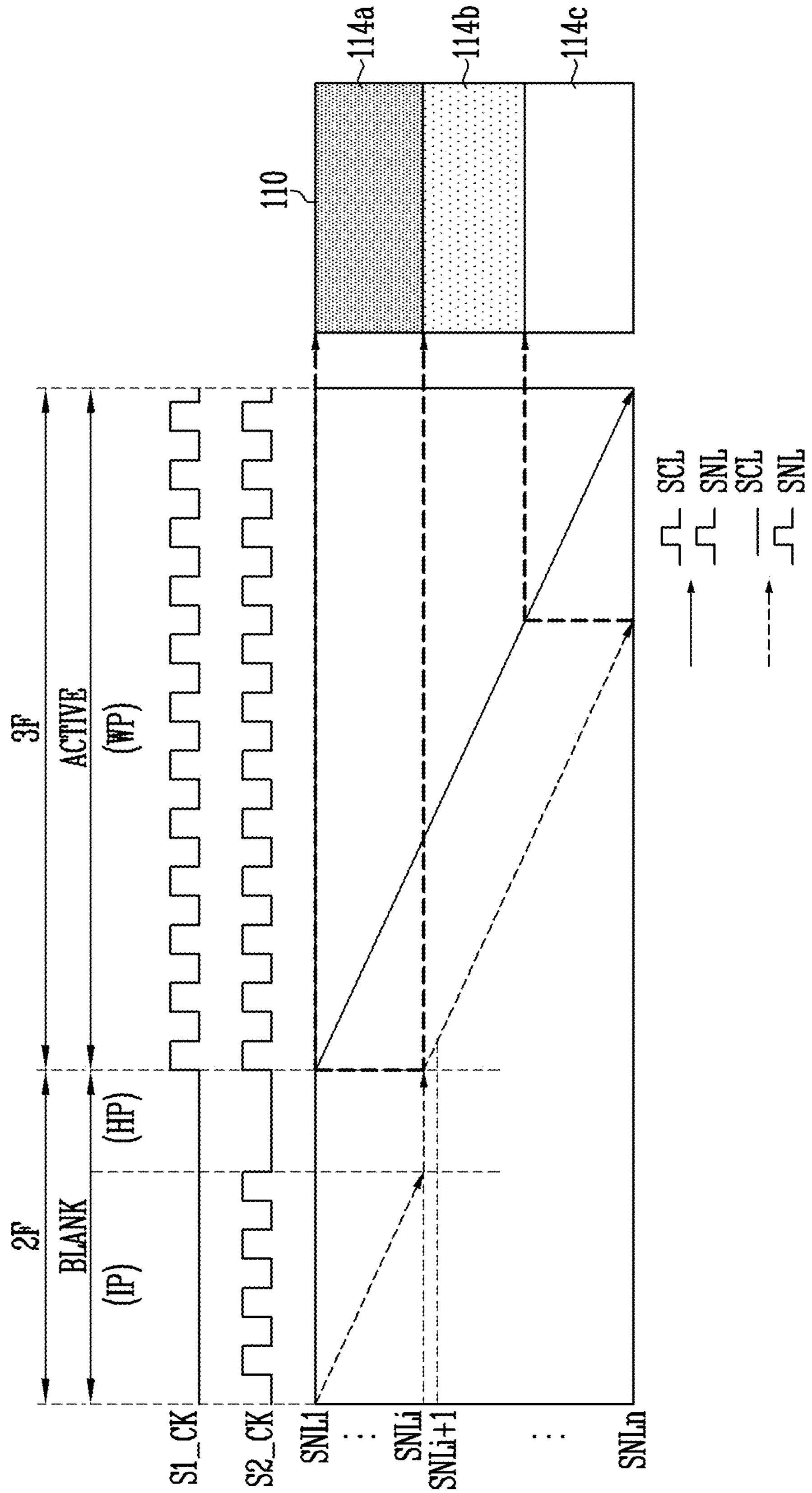
FIG. 15 is a diagram illustrating luminances of a pixel component corresponding to an image of a third frame in FIG. 13A and an image of a second frame in FIG. 14.

FIG. 15 is a diagram illustrating luminances of the pixel component corresponding to the image of the third frame in FIG. 13A and the image of the second frame in FIG. 14.

Referring to FIG. 15, an image displayed in the period of the third frame 3F has a luminance difference between the first area 110*a* and the second area 110*b*, as described in FIG. 13A. Furthermore, an image displayed in the period of the second frame 2F has a luminance difference between the first area 112*a* and the second area 112*b*, as described in FIG. 14.

Here, the images of the second frame 2F and the third frame 3F may be successively displayed, thus resulting in an average luminance difference in a first area 114*a*, a second area 114*b*, and a third area 114*c* of the pixel component 110.

The first area 114*a* may refer to an area where pixels supplied with the initialization signals IS during the initialization period IP of the second frame 2F (or a preceding frame) are positioned.

The second area 114*b* may refer to an area where pixels supplied with the initialization signals IS corresponding to the second frame 2F during the data write period WP of the third frame 3F (or a current frame) are positioned.

The third area 114*c* may refer to an area where pixels that are not supplied with the initialization signals IS corresponding to the second frame 2F during the data write period WP of the third frame 3F are positioned.

In the case where the same data signal is supplied, the luminance of the pixel component 110 may be lowest in the first area 114*a*, and may be highest in the third area 114*c*. In an embodiment of the present disclosure, a luminance deviation of the pixel component 110 may be removed by controlling the width of the enable scan signal SC and/or the enable initialization signal IS that is supplied during the period of the third frame 3F.

Figure 16:
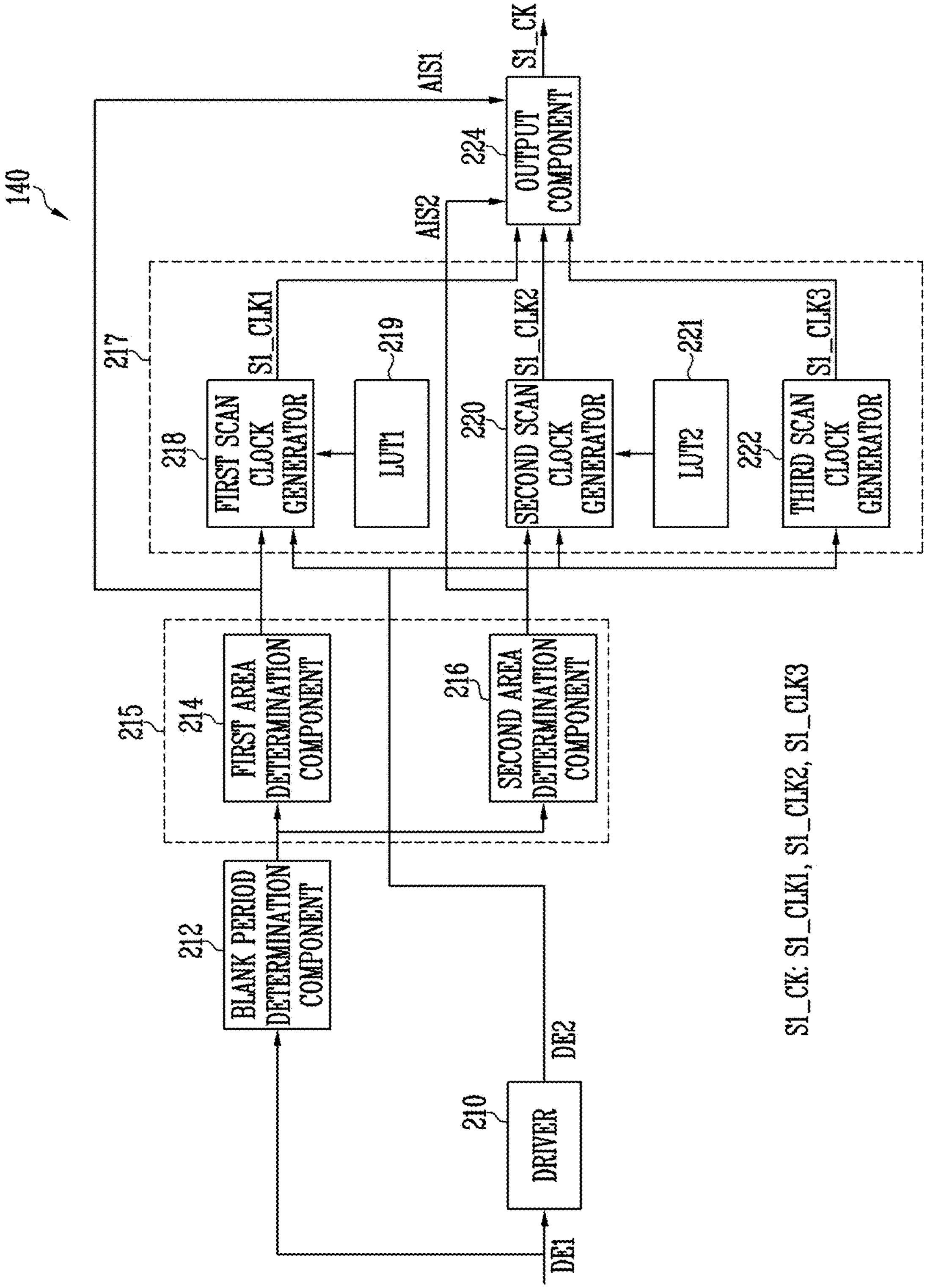
FIG. 16 is a diagram illustrating an embodiment of a timing controller shown in FIG. 1.

FIG. 16 is a diagram illustrating an embodiment of the timing controller 140 shown in FIG. 1. In FIG. 16, only the components required for explanation of the present disclosure are illustrated.

Referring to FIG. 16, the timing controller 140 in accordance with an embodiment of the present disclosure includes a driver 210 (e.g., a driver circuit), a blank period determination component 212 (e.g., a first logic circuit), an area determination component 215 (e.g., a second logic circuit), and a scan clock generator 217.

The driver 210 may be driven in response to a first data enable signal DE1, and include various components. For example, the driver 210 may include a component configured to compensate for data in response to optical data, a component configured to compensate for data in response to the temperature, a component configured to generate various control signals, and the like.

Figure 18:
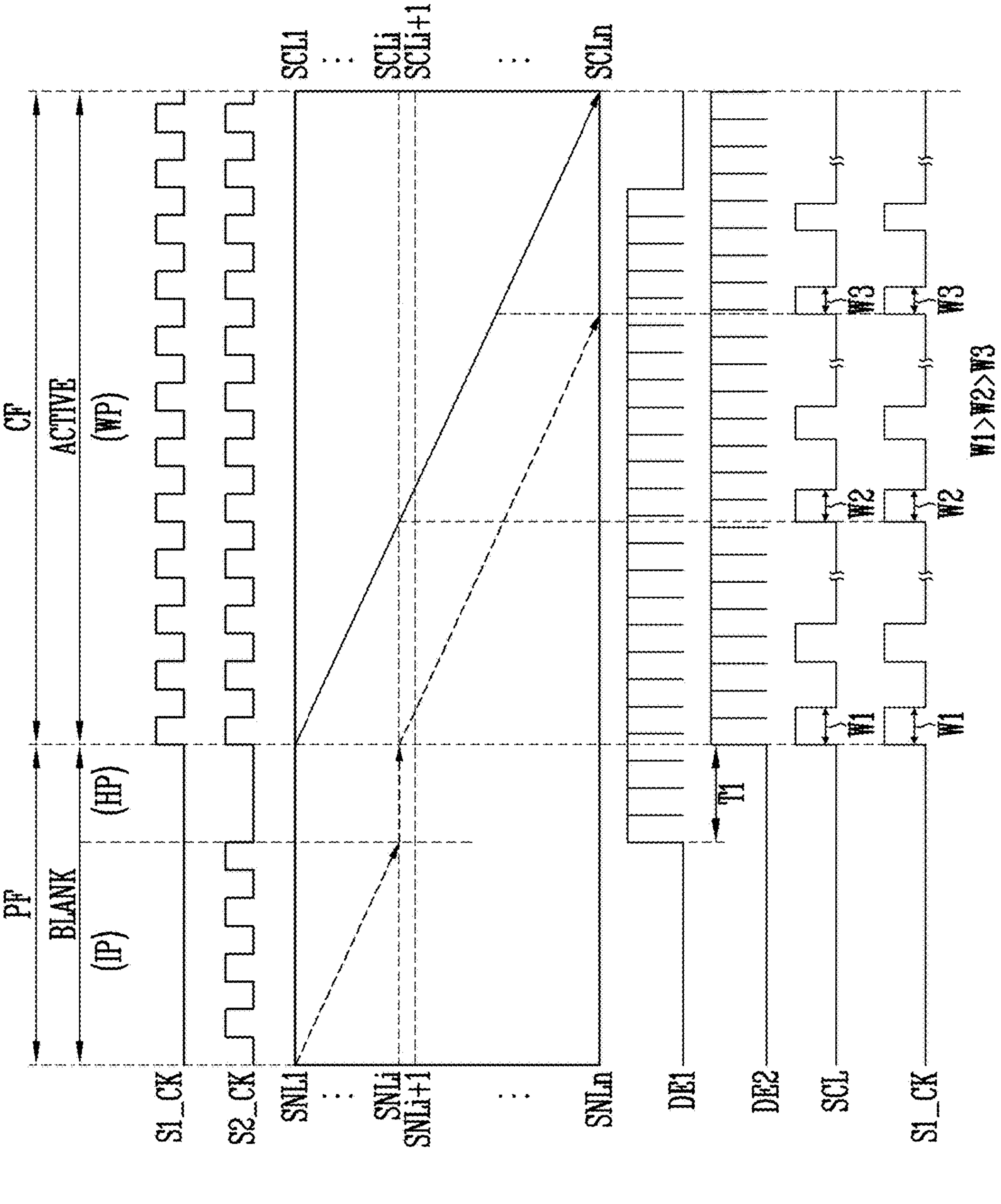

The driver 210 may supply a second data enable signal DE2 to the scan clock generator 217. The second data enable signal DE2 may be a signal delayed by a certain time from the first data enable signal DE1. Here, the certain time may be set in values varying depending on the components included in the driver 210, an operation time of each of the components, and so on. For example, the second data enable signal DE2 may be delayed by a first time T1, as illustrated in FIG. 18.

The blank period determination component 212 may determine a blank period included in a frame period using the first data enable signal DE1. For example, the blank period determination component 212 may count a period during which the first data enable signal DE1 is supplied to determine one frame period, and may determine the blank period in one frame period. For example, the active period included in the one frame period is fixed, so that a blank period corresponding to the one frame period may be adjusted as needed. The blank period information (e.g., the width, area, time, etc. of the blank period) determined by the blank period determination component 212 may be supplied to the area determination component 215.

The area determination component 215 may include a first area determination component 214 (e.g., a third logic circuit) and a second area determination component 216 (e.g., a fourth logic circuit). The area determination component 215 may use the blank period information to determine the first area 114*a*, the second area 114*b*, and the third area 114*c* illustrated in FIG. 15.

For example, the area determination component 215 may use the blank period information to determine a location of the initialization period IP included in a preceding frame PF (refer to FIG. 18), and may determine the first area 114*a*, the second area 114*b*, and the third area 114*c* in correspondence with the location of the initialization period IP.

The first area determination component 214 may determine an area, i.e., the first area 114*a*, where pixels are positioned pixels receiving enable initialization signals IS during the period of the preceding frame PF in correspondence with the location of the initialization period IP of the preceding frame PF.

The second area determination component 216 may determine an area, i.e., the second area 114*b*, where pixels are positioned pixels receiving enable initialization signals IS corresponding to the preceding frame PF during the data write period WP of the current frame CF in correspondence with the location of the initialization period IP of the preceding frame PF. In the case where the first area 114*a* and the second area 114*b* are determined, the third area 114*c* where pixels are positioned pixels that do not receive the initialization signals IS corresponding to the preceding frame PF during the data write period WP of the current frame CF may be determined. The area information corresponding to the first area 114*a* and the second area 114*b* determined in the area determination component 215 may be supplied to the scan clock generator 217 and an output component 224 (e.g., an output circuit).

The scan clock generator 217 may receive a scan clock signal S1_CK. In an embodiment, the scan clock generator 217 generates scan clock signals S1_CK having different duty cycles respectively corresponding to the first area 114*a*, the second area 114*b*, and the third area 114*c*.

The scan clock generator 217 includes a first scan clock generator 218, a first lookup table LUT1 (219), a second scan clock generator 220, a second lookup table LUT2 (221), and a third scan clock generator 222.

The third scan clock generator 222 (or a normal clock signal generator) may supply a third clock signal S1_CLK3 (or a normal clock signal) having a certain duty cycle to the output component 224. The third clock signal S1_CLK3 may be supplied to the first stages FST corresponding to the third area 114*c* as the scan clock signal S1_CK. Here, the first stages FST corresponding to the third area 114*c* may refer to first stages FST electrically connected to scan lines positioned in the third area 114*c*. Pixels positioned in the third area 114*c* may each be supplied with an enable scan signal SC having a width corresponding to an on-duty of the third clock signal S1_CLK3.

Figure 17:
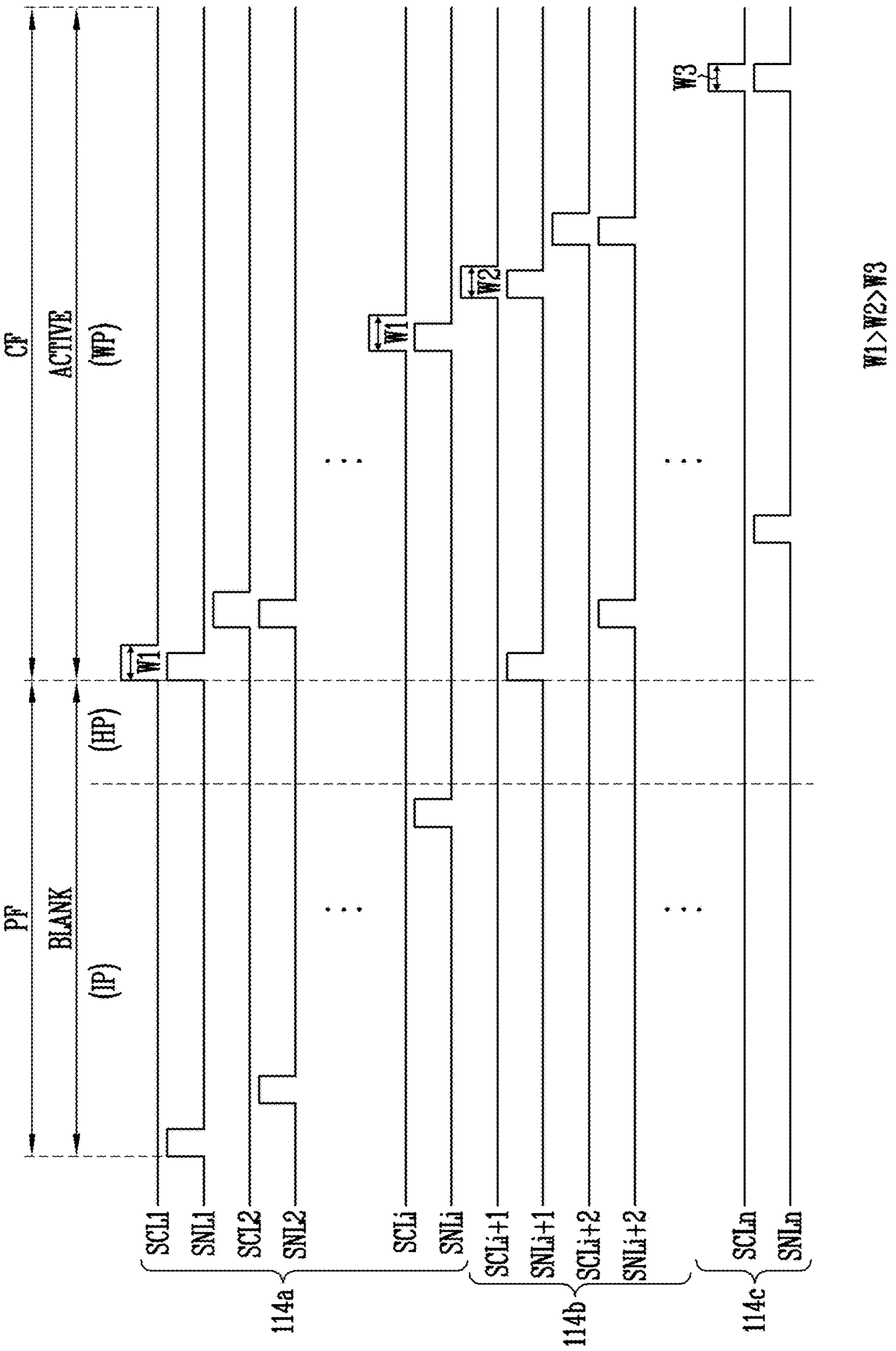
FIGS. 17 and 18 are diagrams illustrating a process of supplying scan signals in accordance with an embodiment of the present disclosure.

In an embodiment, the on-duty of the third clock signal S1_CLK3 has a third width W3 (or a normal width), as shown in FIGS. 17 and 18. Here, the on-duty may refer to a width (or time) in which a gate-on voltage is applied to allow transistors included in the pixels PX to be turned on. In addition, the on-duty of the third clock signal S1_CLK3 may maintain a constant width (i.e., the third width W3) regardless of the number of scan lines (or the number of horizontal lines) included in the third area 114*c*.

The first scan clock generator 218 may receive information about the first area 114*a* from the first area determination component 214. The first scan clock generator 218 that receives the information about the first area 114*a* may extract duty cycle information from the first lookup table 219 in correspondence with the number of scan lines (or the number of horizontal lines) included in the first area 114*a*.

The first scan clock generator 218 that extracts the duty cycle information from the first lookup table 219 may generate a first clock signal S1_CLK1 having a duty cycle corresponding to the duty cycle information and supply the generated first clock signal S1_CLK1 to the output component 224. The first clock signal S1_CLK1 may be supplied to the first stages FST corresponding to the first area 114*a* as the scan clock signal S1_CK. Here, the first stages FST corresponding to the first area 114*a* may refer to first stages FST electrically connected to scan lines positioned in the first area 114*a*. Pixels positioned in the first area 114*a* may each be supplied with an enable scan signal SC having a width corresponding to an on-duty of the first clock signal S1_CLK1.

In an embodiment, the on-duty of the first clock signal S1_CLK1 has a first width W1, as shown in FIGS. 17 and 18. In an embodiment, the first width W1 is set to a width greater (or longer) than the third width W3. In other words, the pixels positioned in the first area 114*a* may be supplied with enable scan signals SC having a larger width (i.e., the first width W1), compared to the pixels positioned in the third area 114*c*.

The width of the on-duty may be set to different values corresponding to the number of scan lines included in the first area 114*a*. Duty cycle (or on-duty) information corresponding to the number of scan lines included in the first area 114*a* may be stored in the first lookup table 219.

The second scan clock generator 220 may receive information about the second area 114*b* from the second area determination component 216. The second scan clock generator 220 that receives the information about the second area 114*b* may extract duty cycle information from the second lookup table 221 in correspondence with the number of scan lines (or the number of horizontal lines) included in the second area 114*b*.

The second scan clock generator 220 that extracts the duty cycle information from the second lookup table 221 may generate a second clock signal S1_CLK2 having a duty cycle corresponding to the duty cycle information and supply the generated second clock signal S1_CLK2 to the output component 224. The second clock signal S1_CLK2 may be supplied to the first stages FST corresponding to the second area 114*b* as the scan clock signal S1_CK. Here, the first stages FST corresponding to the second area 114*b* may refer to first stages FST electrically connected to scan lines positioned in the second area 114*b*. Pixels positioned in the second area 114*b* may each be supplied with an enable scan signal SC having a width corresponding to an on-duty of the second clock signal S1_CLK2.

In an embodiment, the on-duty of the second clock signal S1_CLK2 is set to a second width W2 greater than the third width W3 and less than the first width W1, as illustrated in FIGS. 17 and 18. The pixels positioned in the second area 114*b* may be supplied with an enable scan signal SC having the second width W2.

The width of the on-duty may be set to different values corresponding to the number of scan lines (or the number of horizontal lines) included in the second area 114*b*. Duty cycle (or on-duty) information corresponding to the number of scan lines included in the second area 114*b* may be stored in the second lookup table LUT2.

The output component 224 may receive a signal corresponding to area information from the area determination component 215. For example, in the case where the pixel component 110 is divided into a plurality of areas, the area determination component 215 may supply area information signals AIS1 and AIS2. The area information signals AIS1 and AIS2 may include information corresponding to the first area 114*a* and the second area 114*b*, respectively. In an embodiment, the area information signals AIS1 and AIS2 may further include information corresponding to the third area 114*c*.

For example, in the case where the pixel component 110 is formed of a single area, the area determination component 215 need not supply area information signals AIS1 and AIS2. Here, if the pixel component 110 is formed of a single area, it may indicate that during the data write period WP of the current frame, the initialization signal IS of the preceding frame is not supplied.

In the case where the area information signals AIS1 and AIS2 are not inputted from the area determination component 215, the output component 224 may supply a third clock signal S1_CLK3 as the scan clock signal S1_CK to all of the first stages FST included in the scan driver 130. As a result, the scan lines SCL1 to SCLn may each receive an enable scan signal SC with the third width W3. In other words, according to an embodiment of the present disclosure, in the case where the initialization signal IS of the preceding frame is not supplied during the data write period WP of the current frame, an enable scan signal with the third width W3 may be supplied.

In the case where the area information signals AIS1 and AIS2 are inputted from the area determination component 215, the output component 224 may supply a first clock signal S1_CLK1 as the scan clock signal S1_CK to each of the first stages FST corresponding to the first area 114*a*. As a result, the scan lines positioned in the first area 114*a* may each receive an enable scan signal SC with the first width W1.

In the case where the area information signals AIS1 and AIS2 are inputted from the area determination component 215, the output component 224 may supply a second clock signal S1_CLK2 as the scan clock signal S1_CK to each of the first stages FST positioned in the second area 114*b*. As a result, the scan lines positioned in the second area 114*b* may each receive an enable scan signal SC with the second width W2.

In the case where the area information signals AIS1 and AIS2 are inputted from the area determination component 215, the output component 224 may supply a third clock signal S1_CLK3 as the scan clock signal S1_CK to each of the first stages FST positioned in the third area 114*c*. As a result, the scan lines positioned in the third area 114*c* may each receive an enable scan signal SC with the third width W3.

FIGS. 17 and 18 are diagrams illustrating a process of supplying scan signals in accordance with an embodiment of the present disclosure.

Referring to FIGS. 17 and 18, the scan lines SCL1, SCL2, . . . , and SCLi positioned in the first area 114*a* receive an enable scan signal SC with the first width W1 in response to a first clock signal S1_CLK1.

The scan lines SCLi+1, SCLi+2, . . . positioned in the second area 114*b* each receive an enable scan signal SC with the second width W2 in response to a second clock signal S1_CLK2.

The scan lines . . . , SCLn positioned in the third area 114*c* each receive an enable scan signal SC with the third width W3 in response to a third clock signal S1_CKL3.

In an embodiment, the first width W1 is set to a width greater than the second width W2. Therefore, the pixels positioned in the first area 114*a* may receive a voltage of a data signal for a longer time compared to the pixels positioned in the second area 114*b*. In this case, even with the same data signal supplied, the first area 114*a* may generate light with a higher luminance, compared to the second area 114*b*.

In an embodiment, the second width W2 is set to a width greater than the third width W3. Therefore, the pixels positioned in the second area 114*b* may receive a voltage of a data signal for a longer time compared to the pixels positioned in the third area 114*c*. In this case, even with the same data signal supplied, the second area 114*b* may generate light with a higher luminance, compared to the third area 114*c*.

In other words, in an embodiment of the present disclosure, enable scan signals SC with different widths may be supplied to the respective areas 114*a*, 114*b*, and 114*c* to mitigate a luminance deviation among the areas 114*a*, 114*b*, and 114*c*. Here, the third width W3 may remain fixed, while the first width W1 and the second width W2 may be experimentally determined to mitigate the luminance deviation based on the number of scan lines included in each of the first area 114*a* and the second area 114*b*.

In addition, the data write period WP may be referred to as a first mode, and the initialization period IP may be referred to as a second mode. Here, in the case where a period in which an i-th pixel row (where i is a natural number) operates in the first mode overlaps a period in which an i+a-th pixel row (where a is a natural number) operates in the second mode, a scan signal with the first width W1 is supplied to an i-th scan line, and a scan signal with the second width W2 is supplied to an i+a-th scan line. Furthermore, a scan signal with the third width W3 is supplied to an i+a+b-th scan line (where b is a natural number) positioned on an i+a+b-th pixel row that operates only in the first mode. For example, as shown in FIG. 17, the enable initialization signal supplied to initialization line SNL1 overlaps with the enable initialization signal supplied to SNLi+1 during the active period.

Figure 19:
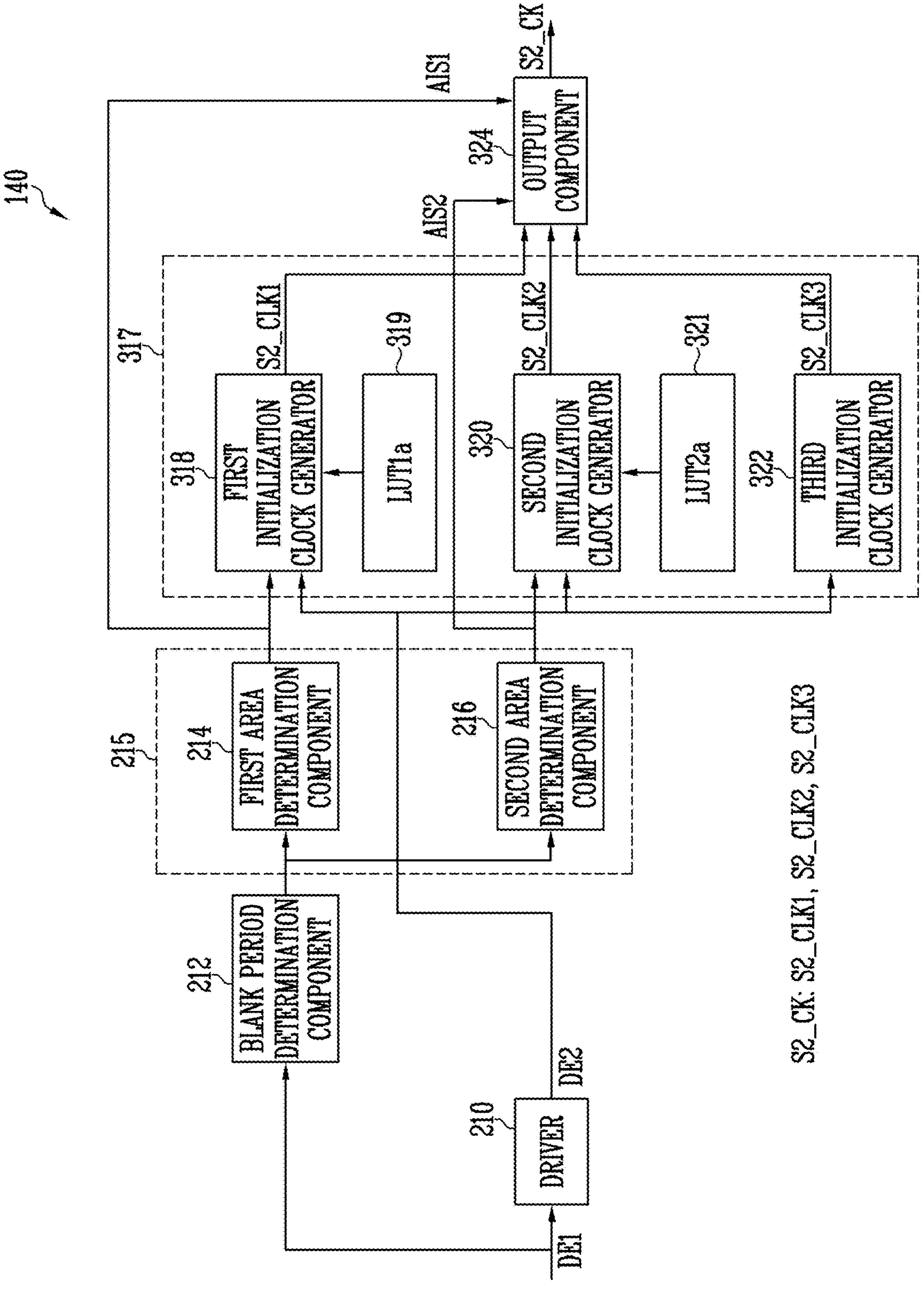
FIG. 19 is a diagram illustrating an embodiment of a timing controller shown in FIG. 1.

FIG. 19 is a diagram illustrating an embodiment of the timing controller shown in FIG. 1. In FIG. 19, only the components required for explanation of the present disclosure are illustrated. In the following description of FIG. 19, redundant explanation pertaining to the configuration similar or identical to that of FIG. 16 will be briefly mentioned.

Referring to FIG. 19, the timing controller 140 in accordance with an embodiment of the present disclosure may include a driver 210, a blank period determination component 212, an area determination component 215, and an initialization clock generator 317.

Figure 21:
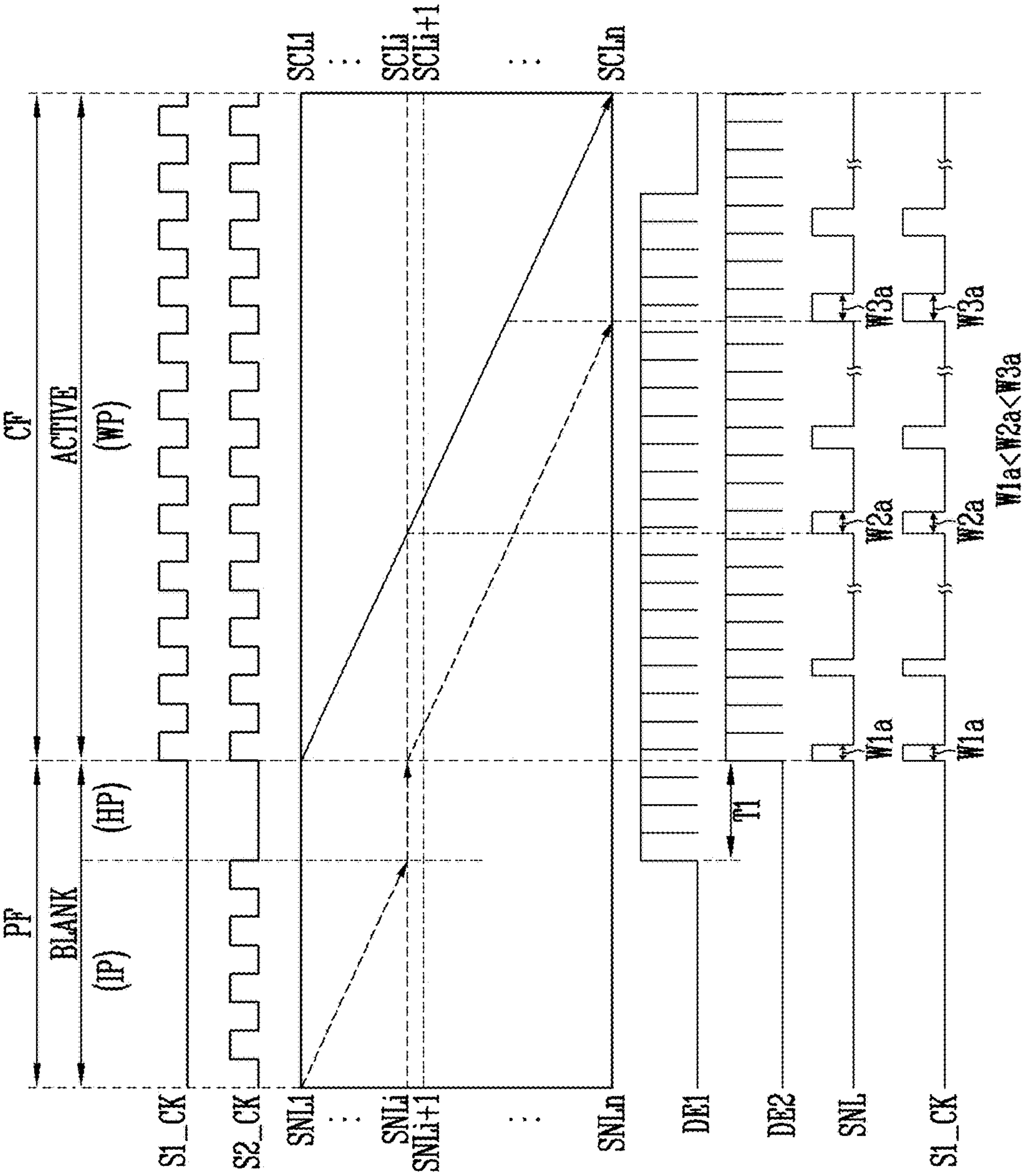

The driver 210 may be driven in response to a first data enable signal DE1, and include various components. The driver 210 may supply a second data enable signal DE2 to the initialization clock generator 317. The second data enable signal DE2 may be a signal delayed by a certain time from the first data enable signal DE1. For example, the second data enable signal DE2 may be delayed by a first time T1, as illustrated in FIG. 21.

The blank period determination component 212 may determine a blank period included in a frame period using the first data enable signal DE1. The blank period information (e.g., the width, area, time, etc. of the blank period) determined by the blank period determination component 212 may be supplied to the area determination component 215.

The area determination component 215 may include a first area determination component 214 and a second area determination component 216. The area determination component 215 may use the blank period information to determine the first area 114*a*, the second area 114*b*, and the third area 114*c* illustrated in FIG. 15.

The first area determination component 214 may determine an area, i.e., the first area 114*a*, where pixels are positioned receiving the enable initialization signal IS during the period of the preceding frame PF in correspondence with the location of the initialization period IP of the preceding frame PF.

The second area determination component 216 may determine an area, i.e., the second area 114*b*, where pixels are positioned receiving enable initialization signals IS corresponding to the preceding frame PF during the data write period WP of the current frame CF in correspondence with the location of the initialization period IP of the preceding frame PF.

In the case where the first area 114*a* and the second area 114*b* are determined, the third area 114*c* where pixels are positioned that do not receive the enable initialization signals IS corresponding to the preceding frame PF during the data write period WP of the current frame CF may be determined. The area information corresponding to the first area 114*a* and the second area 114*b* determined in the area determination component 215 may be supplied to the initialization clock generator 317 and the output component 324.

The initialization clock generator 317 may receive an initialization clock signal S2_CK. Here, the initialization clock generator 317 may generate initialization clock signals S2_CK having different duty cycles respectively corresponding to the first area 114*a*, the second area 114*b*, and the third area 114*c*.

In an embodiment, the initialization clock generator 317 includes a first initialization clock generator 318, a first lookup table LUT1*a* (319), a second initialization clock generator 320, a second lookup table LUT2*a* (321), and a third initialization clock generator 322.

The third initialization clock generator 322 (or a normal clock signal generator) may supply a third clock signal S2_CLK3 (or a normal clock signal) having a certain duty cycle to the output component 324. The third clock signal S2_CLK3 may be supplied to the second stages SST corresponding to the third area 114*c* as the initialization clock signal S2_CK. Hence, pixels positioned in the third area

114*c* may each be supplied with an enable initialization signal IS having a width corresponding to an on-duty of the third clock signal S2_CLK3.

Figure 20:
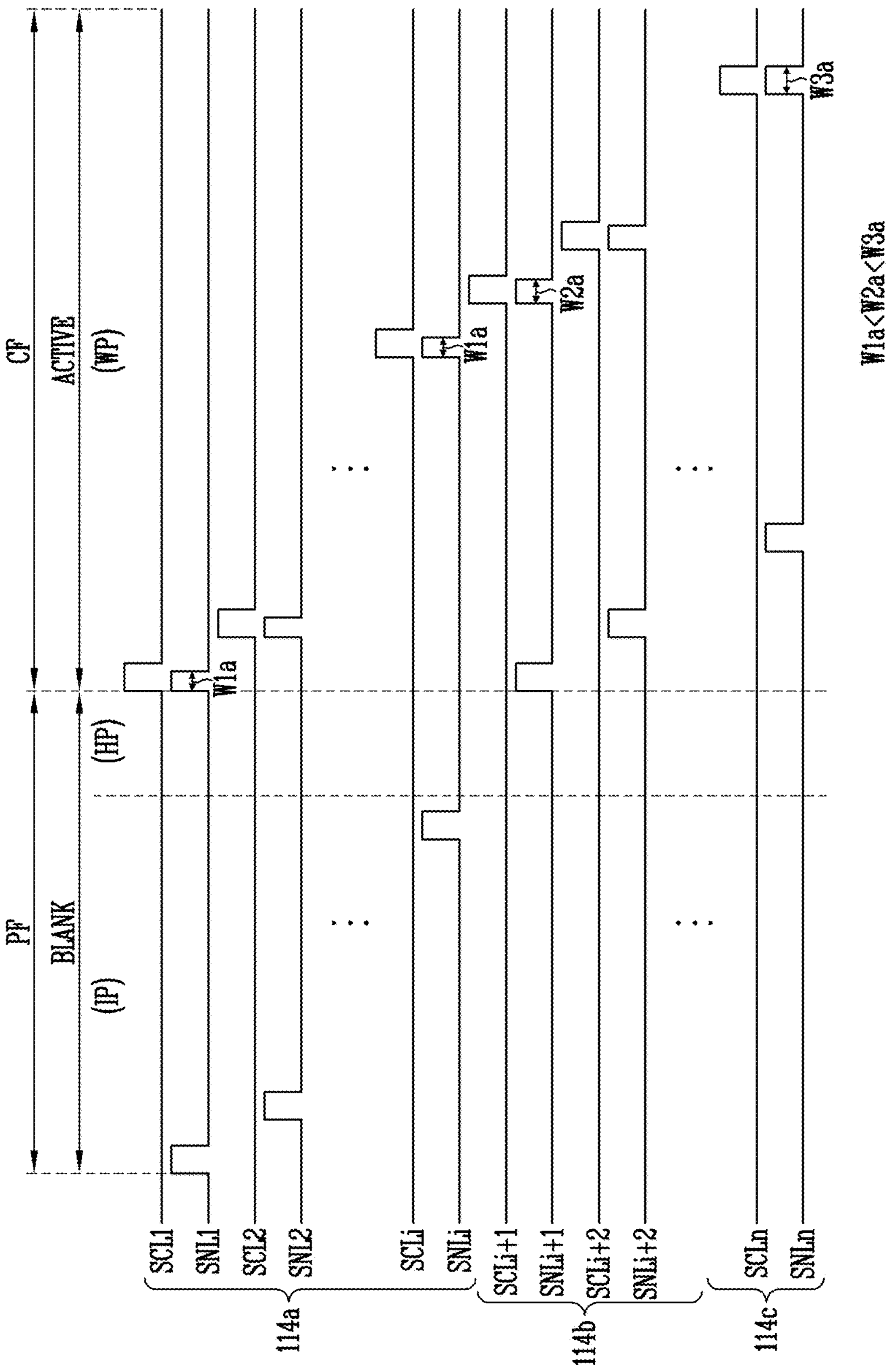
FIGS. 20 and 21 are diagrams illustrating a process of supplying initialization signals in accordance with an embodiment of the present disclosure.

In an embodiment, the on-duty of the third clock signal S2_CLK3 has a third width W3*a* (or a normal width), as shown in FIGS. 20 and 21. The on-duty of the third clock signal S2_CLK3 may maintain a constant width (i.e., the third width W3*a*) regardless of the number (or size, surface area, or the like) of scan lines (or the number of horizontal lines) included in the third area 114*c*.

The first initialization clock generator 318 may receive information about the first area 114*a* from the area determination component 215. The first initialization clock generator 318 that receives the information about the first area 114*a* may extract duty cycle information from the first lookup table 319 in correspondence with the number of initialization lines (or the number of horizontal lines) included in the first area 114*a*.

The first initialization clock generator 318 that extracts the duty cycle information from the first lookup table 319 may generate a first clock signal S2_CLK1 having a duty cycle corresponding to the duty cycle information and supply the generated first clock signal S2_CLK1 to the output component 324. The first clock signal S2_CLK1 may be supplied to the second stages SST corresponding to the first area 114*a* as the initialization clock signal S2_CK. Hence, pixels positioned in the first area 114*a* may each be supplied with an enable initialization signal IS having a width corresponding to an on-duty of the first clock signal S2_CLK1.

In an embodiment, the on-duty of the first clock signal S2_CLK1 has a first width W1*a*, as shown in FIGS. 20 and 21. In an embodiment, the first width W1*a* is set to a width less (or shorter) than the third width W3*a*. Hence, the pixels positioned in the first area 114*a* may be supplied with enable scan signals SC having a smaller width (i.e., the first width W1*a*), compared to the pixels positioned in the third area 114*c*. The width of the on-duty may be set to different values corresponding to the number of initialization lines included in the first area 114*a*. Duty cycle (or on-duty) information corresponding to the number of initialization lines included in the first area 114*a* may be stored in the first lookup table 319.

The second initialization clock generator 320 may receive information about the second area 114*b* from the area determination component 215. The second initialization clock generator 320 that receives the information about the second area 114*b* may extract duty cycle information from the second lookup table 321 in correspondence with the number of initialization lines included in the second area 114*b*.

The second initialization clock generator 320 that extracts the duty cycle information from the second lookup table 321 may generate a second clock signal S2_CLK2 having a duty cycle corresponding to the duty cycle information and supply the generated second clock signal S2_CLK2 to the output component 324. The second clock signal S2_CLK2 may be supplied to the second stages SST corresponding to the second area 114*b* as the initialization clock signal S2_CK. Hence, pixels positioned in the second area 114*b* may each be supplied with an enable initialization signal IS having a width corresponding to an on-duty of the second clock signal S2_CLK2.

In an embodiment, the on-duty of the second clock signal S2_CLK2 may have a width less than the third width W3*a* and greater than the first width W1*a*, as shown in FIGS. 20 and 21. Hence, the pixels positioned in the second area 114*b* may be supplied with an enable initialization signal SC having the second width W2*a*.

The width of the on-duty may be set to different values corresponding to the number of initialization lines included in the second area 114*b*. Duty cycle (or on-duty) information corresponding to the number of horizontal lines included in the second area 114*b* may be stored in the second lookup table LUT2.

The output component 324 may receive a signal corresponding to area information from the area determination component 215. For example, in the case where the pixel component 110 is divided into a plurality of areas, the area determination component 215 may supply area information signals AIS1 and AIS2. The area information signals AIS1 and AIS2 may include information corresponding to the first area 114*a* and the second area 114*b*, respectively. In an embodiment, the area information signals AIS1 and AIS2 may further include information corresponding to the third area 114*c*.

For example, in the case where the pixel component 110 is formed of a single area, the area determination component 215 need not supply area information signals AIS1 and AIS2. Here, if the pixel component 110 is formed of a single area, it may indicate that during the data write period WP of the current frame, the enable initialization signal IS of the preceding frame is not supplied.

In the case where the area information signals AIS1 and AIS2 are not inputted from the area determination component 215, the output component 324 may supply the third clock signal S2_CLK3 as the initialization clock signal S2_CK to all of the second stages SST included in the scan driver 130. As a result, the initialization lines SNL1 to SNLn may each receive an enable initialization signal IS with the third width W3*a*. In other words, in an embodiment of the present disclosure, if the enable initialization signal IS of the preceding frame PF is not supplied during the data write period WP of the current frame CF, the enable initialization signal IS with the third width W3*a* may be supplied.

In the case where the area information signals AIS1 and AIS2 are inputted from the first area determination component 214, the output component 324 may supply a first clock signal S2_CLK1 as the initialization clock signal S2_CK to each of the second stages SST positioned in the first area 114*a*. As a result, the initialization lines positioned in the first area 114*a* may each receive an enable initialization signal IS with the first width W1*a*.

In the case where the area information signals AIS1 and AIS2 are inputted from the second area determination component 216, the output component 324 may supply a second clock signal S2_CLK2 as the initialization clock signal S2_CK to each of the second stages SST positioned in the second area 114*b*. As a result, the scan lines positioned in the second area 114*b* may each receive an enable initialization signal IS with the second width W2*a*.

In the case where the area information signals AIS1 and AIS2 are inputted from the area determination component 215, the output component 324 may supply a third clock signal S2_CLK3 as the initialization clock signal S2_CK to each of the second stages SST positioned in the third area 114*c*. As a result, the scan lines positioned in the third area 114*c* may each receive an enable initialization signal IS with the third width W3.

Although FIG. 19 illustrates the timing controller 140 including only the components for controlling the width of the enable initialization signal IS, embodiments of the present disclosure are not limited thereto. For example, the timing controller 140 of FIG. 19 may further include the first scan clock generator 218 and the second scan clock generator 220 illustrated in FIG. 16. In this case, the width of the enable scan signal SC may also be controlled along with the width of the enable initialization signal IS.

FIGS. 20 and 21 are diagrams illustrating a process of supplying initialization signals in accordance with an embodiment of the present disclosure.

Referring to FIGS. 20 and 21, the initialization lines SNL1, SNL2, . . . , and SNLi positioned in the first area 114*a* receive an enable initialization signal IS with the first width W1*a* in response to a first clock signal S2_CLK1.

The initialization lines SNLi+1, SNLi+2, . . . positioned in the second area 114*b* each receive an enable initialization signal IS with the second width W2*a* in response to a second clock signal S2_CLK2.

The initialization lines . . . , SNLn positioned in the third area 114*c* each receive an enable initialization signal IS with the third width W3*a* in response to a third clock signal S2_CLK3.

In an embodiment, the first width W1*a* is set to a width less than the second width W2*a*. Therefore, the pixels positioned in the first area 114*a* may receive the voltage of the reference power Vref for a shorter time compared to the pixels positioned in the second area 114*b*. In this case, even with the same data signal supplied, the first area 114*a* may generate light with a higher luminance, compared to the second area 114*b*.

In an embodiment, the second width W2*a* is set to a width less than the third width W3*a*. Therefore, the pixels positioned in the second area 114*b* may receive the voltage of the reference power Vref for a shorter time compared to the pixels positioned in the third area 114*c*. In this case, even with the same data signal supplied, the second area 114*b* may generate light with a higher luminance, compared to the third area 114*c*.

In other words, in an embodiment of the present disclosure, enable initialization signals IS with different widths may be supplied to the respective areas 114*a*, 114*b*, and 114*c*, whereby a luminance deviation among the areas 114*a*, 114*b*, and 114*c* can be mitigated. Here, the third width W3*a* may remain fixed, while the first width W1*a* and the second width W2*a* may be experimentally determined to mitigate the luminance deviation based on the number of horizontal lines (or the number of scan lines) included in each of the first area 114*a* and the second area 114*b*.

In addition, the data write period WP may be referred to as a first mode, and the initialization period IP may be referred to as a second mode. Here, in the case where a period in which an i-th pixel row operates in the first mode overlaps a period in which an i+a-th pixel row operates in the second mode, an initialization signal with the first width W1*a* (or a fourth width) is supplied to an i-th initialization line, and an initialization signal with the second width W2*a* (or a fifth width) is supplied to an i+a-th initialization line. Furthermore, an initialization signal with the third width W3*a* (or a sixth width) is supplied to an i+a+b-th initialization line (where b is a natural number) positioned on an i+a+b-th pixel row that operates only in the first mode.

In a display device and a method of driving the display device in accordance with embodiments of the present disclosure, visibility may be increased, whereby images can be displayed at various refresh rates.

However, effects of the present disclosure are not limited to the above-described effects, and various modifications are possible without departing from the spirit and scope of the present disclosure.

While embodiments of the present disclosure have been described above, those skilled in the art will appreciate that various modifications, additions and substitutions are possible, without departing from the scope and spirit of the present disclosure.

What is claimed is:

1. A display device, comprising:
- a display panel including pixels connected to scan lines and initialization lines;
- a scan driver including first stages configured to supply enable scan signals to the scan lines during an active period of one frame, and second stages configured to supply enable initialization signals to the initialization lines during the active period and a blank period of the one frame; and
- a timing controller configured to supply scan clock signals and initialization clock signals to the scan driver,
- wherein, when the enable initialization signals are supplied in an overlapping manner to two of the initialization lines during the active period of a current frame, the enable scan signals having different widths are supplied to respective areas of the display panel.

2. The display device according to claim 1, wherein an area of the display panel in the active period of the current frame comprises:
- a first area where pixels supplied with the enable initialization signals during the blank period of a preceding frame are positioned;
- a second area where pixels supplied with the enable initialization signals corresponding to the blank period of the preceding frame are positioned; and
- a third area that excludes the first area and the second area.

3. The display device according to claim 2, wherein, during the active period of the current frame, the scan driver:
- supplies enable scan signals with a first width to scan lines positioned in the first area;
- supplies enable scan signals with a second width different from the first width to scan lines positioned in the second area; and
- supplies enable scan signals with a third width different from the first width and the second width to scan lines positioned in the third area.

4. The display device according to claim 3, wherein the first width is greater than the second width, and the second width is greater than the third width.

5. The display device according to claim 3, wherein the timing controller comprises:
- a driver configured to receive a first data enable signal and operate in response to the first data enable signal;
- a first logic circuit configured to determine a length of a blank period using the first data enable signal;
- a second logic circuit configured to determine the first area and the second area based on the length of the blank period determined by the first logic circuit;
- a scan clock generator configured to receive a second data enable signal outputted from the driver to generate the scan clock signals corresponding to the first area, the second area, and the third area; and
- an output circuit configured to output the scan clock signals.

6. The display device according to claim 5, wherein the second data enable signal is the first data enable signal delayed by a preset time.

7. The display device according to claim 5, wherein the second logic circuit comprises:
- a third logic circuit configured to determine the first area based on the length of the blank period; and a fourth logic circuit configured to determine the second area based on the length of the blank period.

8. The display device according to claim 5, wherein the scan clock generator comprises:

a first lookup table configured to store duty cycle information corresponding to a number of scan lines included in the first area;

a first scan clock generator connected to the first lookup table, and configured to generate a first clock signal having an on-duty with the first width corresponding to the number of scan lines included in the first area;

a second lookup table configured to store duty cycle information corresponding to a number of scan lines included in the second area;

a second scan clock generator connected to the second lookup table, and configured to generate a second clock signal having an on-duty with the second width corresponding to the number of scan lines included in the second area; and a third scan clock generator configured to generate a third clock signal having an on-duty with the third width.

9. The display device according to claim 8, wherein the first lookup table stores duty cycle information with the first width having different lengths corresponding to the number of scan lines included in the first area, and wherein the second lookup table stores duty cycle information with the second width having different lengths corresponding to the number of scan lines included in the second area.

10. The display device according to claim 8, wherein the output circuit, supplies the first clock signal as the scan clock signal to the first stages connected to the scan lines positioned in the first area, supplies the second clock signal as the scan clock signal to the first stages connected to the scan lines positioned in the second area, and supplies the third clock signal as the scan clock signal to the first stages connected to the scan lines positioned in the third area.

11. The display device according to claim 1, wherein during the active period of the current frame, when the enable initialization signal corresponding to the blank period of a preceding frame is not supplied, the scan driver supplies the enable scan signals having an identical width to the scan lines.

12. The display device according to claim 1, wherein the scan driver supplies the enable initialization signals having different widths to respective areas of the display panel.

13. A display device, comprising:

a display panel including pixels connected to scan lines and initialization lines;

a scan driver including first stages configured to supply enable scan signals to the scan lines during an active period of one frame, and second stages configured to supply an enable initialization signal to the initialization lines during the active period and a blank period of the one frame;

a timing controller configured to supply scan clock signals and initialization clock signals to the scan driver, wherein, when the enable initialization signals are supplied in an overlapping manner to two of the initialization lines during the active period of a current frame, the enable initialization signals having different widths are supplied to respective areas of the display panel.

14. The display device according to claim 13, wherein an area of the pixel component in the active period of the current frame comprises:

a first area where pixels supplied with the enable initialization signals during the blank period of a preceding frame are positioned;

a second area where pixels supplied with the enable initialization signals corresponding to the blank period of the preceding frame are positioned; and a third area that excludes the first area and the second area.

15. The display device according to claim 14, wherein, during the active period of the current frame, the scan driver:

supplies enable initialization signals with a first width to initialization lines positioned in the first area;

supplies enable initialization signals with a second width different from the first width to initialization lines positioned in the second area; and supplies enable initialization signals with a third width different from the first width and the second width to initialization lines positioned in the third area.

16. The display device according to claim 15, wherein the first width is less than the second width, and the second width is less than the third width.

17. The display device according to claim 15, wherein the timing controller comprises:

a driver configured to receive a first data enable signal and operate based on the first data enable signal;

a first logic circuit configured to determine a length of a blank period using the first data enable signal;

a second logic circuit configured to determine the first area and the second area based on the length of the blank period determined by the blank period determination component;

an initialization clock generator configured to receive a second data enable signal outputted from the driver and generate the initialization clock signals corresponding to the first area, the second area, and the third area; and an output circuit configured to output the initialization clock signals.

18. The display device according to claim 17, wherein the initialization clock generator comprises:

a first lookup table configured to store duty cycle information corresponding to a number of initialization lines included in the first area;

a first initialization clock generator connected to the first lookup table, and configured to generate a first clock signal having an on-duty with the first width corresponding to the number of initialization lines included in the first area;

a second lookup table configured to store duty cycle information corresponding to a number of initialization lines included in the second area;

a second initialization clock generator connected to the second lookup table, and configured to generate a second clock signal having an on-duty with the second width corresponding to the number of initialization lines included in the second area; and a third initialization clock generator configured to generate a third clock signal having an on-duty with the third width.

19. The display device according to claim 18, wherein the output circuit supplies the first clock signal as the initialization clock signal to the second stages connected to the initialization lines positioned in the first area, supplies the second clock signal as the initialization clock signal to the second stages connected to the initialization lines positioned in the second area, and supplies the third clock signal as the initialization clock signal to the second stages connected to the initialization lines positioned in the third area.

20. A display device, comprising:

a display panel including pixels connected to first to n-th scan lines and first to n-th initialization lines, where n is a natural number; and a scan driver configured to supply enable scan signals to scan lines and supply enable initialization signals to initialization lines during a first mode, and supply enable initialization signals to the initialization lines during a second mode, wherein, when a period in which an i-th pixel row of the display panel operates in the first mode overlaps a period in which an i+a-th pixel row of the display panel operates in the second mode, a scan signal with a first width is supplied to an i-th scan line of the scan lines, and a scan signal with a second width different from the first width is supplied to an i+a-th scan line of the scan lines, where i and a are natural numbers.

21. The display device according to claim 20, wherein a scan signal with a third width different from the first width and the second width is supplied to an i+a+b-th scan line of the scan lines positioned on an i+a+b-th pixel row of the display panel that operates only in the first mode, where b is a natural number.

22. The display device according to claim 21, wherein the first width is greater than the second width, and the second width is greater than the third width.

23. The display device according to claim 20, wherein an initialization signal with a fourth width is supplied to an i-th initialization line of the initialization lines, and an initialization signal with a fifth width different from the fourth width is supplied to an i+a-th initialization line of the initialization lines.

24. The display device according to claim 23, wherein an initialization signal with a sixth width different from the fourth width and the fifth width is supplied to an i+a+b-th initialization line of the initialization lines positioned on an i+a+b-th pixel row of the display panel that operates only in the first mode, where b is a natural number.

25. The display device according to claim 24, wherein the fourth width is less than the fifth width, and the fifth width is less than the sixth width.

26. A method of driving a display device including pixels included in a display panel and connected to scan lines and initialization lines, the method comprising:

supplying enable scan signals to the scan lines during an active period of one frame, and supplying enable initialization signals to the initialization lines during the active period and a blank period of the one frame, wherein when, during the active period of a current period, the enable initialization signals corresponding to the blank period of a preceding frame are supplied, the enable scan signals having different widths are supplied to respective areas of the display panel.

27. The method according to claim 26, wherein the areas of the pixel component comprise:

a first area where pixels supplied with the enable initialization signals during the blank period of the preceding frame are positioned;

a second area where pixels supplied with the enable initialization signals corresponding to the blank period of the preceding frame are positioned; and a third area that excludes the first area and the second area.

28. The method according to claim 27, further comprising:

supplying enable scan signals with a first width to scan lines positioned in the first area;

supplying enable scan signals with a second width different from the first width to scan lines positioned in the second area; and supplying enable scan signals with a third width different from the first width and the second width to scan lines positioned in the third area.

29. The method according to claim 28, wherein the first width is greater than the second width, and the second width is greater than the third width.

30. The method according to claim 27, wherein the enable initialization signals have different widths for the respective areas of the pixel component corresponding to the active period of the current frame.

31. The method according to claim 30, further comprising:

supplying enable initialization signals with a first width to the initialization lines positioned in the first area;

supplying enable initialization signals with a second width different from the first width to the initialization lines positioned in the second area; and supplying enable initialization signals with a third width different from the first width and the second width to the initialization lines positioned in the third area.

32. The method according to claim 31, wherein the first width is less than the second width, and the second width is less than the third width.

* * * * *